United States Patent
Iyer et al.

(10) Patent No.: US 10,735,665 B2
(45) Date of Patent: Aug. 4, 2020

(54) METHOD AND SYSTEM FOR HEAD MOUNTED DISPLAY INFRARED EMITTER BRIGHTNESS OPTIMIZATION BASED ON IMAGE SATURATION

(71) Applicant: Dell Products, LP, Round Rock, TX (US)

(72) Inventors: Vivek Viswanathan Iyer, Austin, TX (US); Yagiz C. Yildiz, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 88 days.

(21) Appl. No.: 16/175,516

(22) Filed: Oct. 30, 2018

(65) Prior Publication Data
US 2020/0137289 A1    Apr. 30, 2020

(51) Int. Cl.
*G06T 7/80* (2017.01)
*H04N 5/235* (2006.01)

(52) U.S. Cl.
CPC ............ *H04N 5/2354* (2013.01); *G06T 7/80* (2017.01); *G06T 2207/10048* (2013.01); *G06T 2207/20072* (2013.01)

(58) Field of Classification Search
CPC .................................................. H04N 5/2354
See application file for complete search history.

(56) References Cited

U.S. PATENT DOCUMENTS

| | | | | |
|---|---|---|---|---|
| 6,137,893 | A * | 10/2000 | Michael .................... | G06T 7/80 348/87 |
| 7,660,437 | B2 * | 2/2010 | Breed ................ | G06K 9/00369 382/100 |
| 7,689,321 | B2 * | 3/2010 | Karlsson .............. | G06K 9/6296 700/253 |
| 7,774,158 | B2 * | 8/2010 | Domingues Goncalves ............... | G01C 21/12 702/152 |
| 9,002,098 | B1 * | 4/2015 | Chelian ..................... | G06T 7/74 382/153 |
| 9,074,878 | B2 * | 7/2015 | Steffey .................... | G01S 17/86 |

(Continued)

OTHER PUBLICATIONS

Samuel W. Hasinoff, "Saturation (imaging)," Jan. 2014, 4 pages.

(Continued)

*Primary Examiner* — Pankaj Kumar
*Assistant Examiner* — Timothy R Newlin
(74) *Attorney, Agent, or Firm* — Prol Intellectual Property Law, PLLC; H. Kenneth Prol

(57) ABSTRACT

An information handling system operating a wearable headset IR emitter saturation correction system may comprise an infrared emitter emitting IR light, a camera capturing a calibration image and a first session image of the IR light reflected from a landmark, and a SLAM engine generating a first session SLAM frame. A processor may execute code instructions to compare the measured calibration pixel brightness value for each pixel associated with the landmark in a calibration image with a measured first session pixel brightness value for each pixel associated with the landmark in the first session image to determine whether the first session SLAM frame is over or under saturated, and determine an adjusted brightness if the first session SLAM frame is over or under saturated. The infrared emitter may emit light according to the adjusted brightness.

20 Claims, 8 Drawing Sheets

(56) References Cited

U.S. PATENT DOCUMENTS

| | | | |
|---|---|---|---|
| 2005/0238200 A1* | 10/2005 | Gupta | G06K 9/00201 |
| | | | 382/103 |
| 2010/0094460 A1* | 4/2010 | Choi | B25J 9/1692 |
| | | | 700/251 |
| 2010/0208057 A1* | 8/2010 | Meier | G06T 19/006 |
| | | | 348/135 |
| 2010/0328481 A1* | 12/2010 | Shimizu | G06T 7/507 |
| | | | 348/222.1 |
| 2012/0191287 A1* | 7/2012 | Shin | G05D 1/027 |
| | | | 701/28 |
| 2014/0176535 A1 | 6/2014 | Krig | |
| 2014/0350839 A1* | 11/2014 | Pack | G01C 21/30 |
| | | | 701/409 |
| 2017/0186146 A1* | 6/2017 | Raniwala | G06T 7/521 |
| 2018/0176483 A1* | 6/2018 | Knorr | G06T 19/006 |

OTHER PUBLICATIONS

Stack Overflow, "How to determine if an image is well saturated?," Oct. 2013, 4 pages.

Axis Communications, "Prevent / reduce IR reflections on dome cameras with built-in IR," Rev. 1.3, Sep. 2015, 3 pages.

J. Blanc-Talon, W. Philips, D. Popescu and P. Scheunders, "Advanced Concepts for Intelligent Vision Systems," 8th International ACIVS Conference, Sep. 2006, p. 691 (1 page) https://books.google.com/books?id=fnITZe3AOUkC&pg=PA691&lpg=PA691&dq=overexposure+illumination+adjustment&source=bl&ots=RfEAl8Hi8q&sig=zhdK9p_oX11neQs9Ynm2EMe9M9Q&hl=en&sa=X&ved=0ahUKEwj9yt-DnKTZAhVH74MKHbwmCdYQ6AEIPTAC#v=onepage&q=overexposure%20illumination%20adjustment&f=false.

* cited by examiner

METHOD AND SYSTEM FOR HEAD MOUNTED DISPLAY INFRARED EMITTER BRIGHTNESS OPTIMIZATION BASED ON IMAGE SATURATION

FIELD OF THE DISCLOSURE

The present disclosure generally relates to head mounted displays for information handling systems. The present disclosure more specifically relates to optimizing intensities emitted by infrared emitters of a head mounted display information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a head mounted user interface and/or display.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
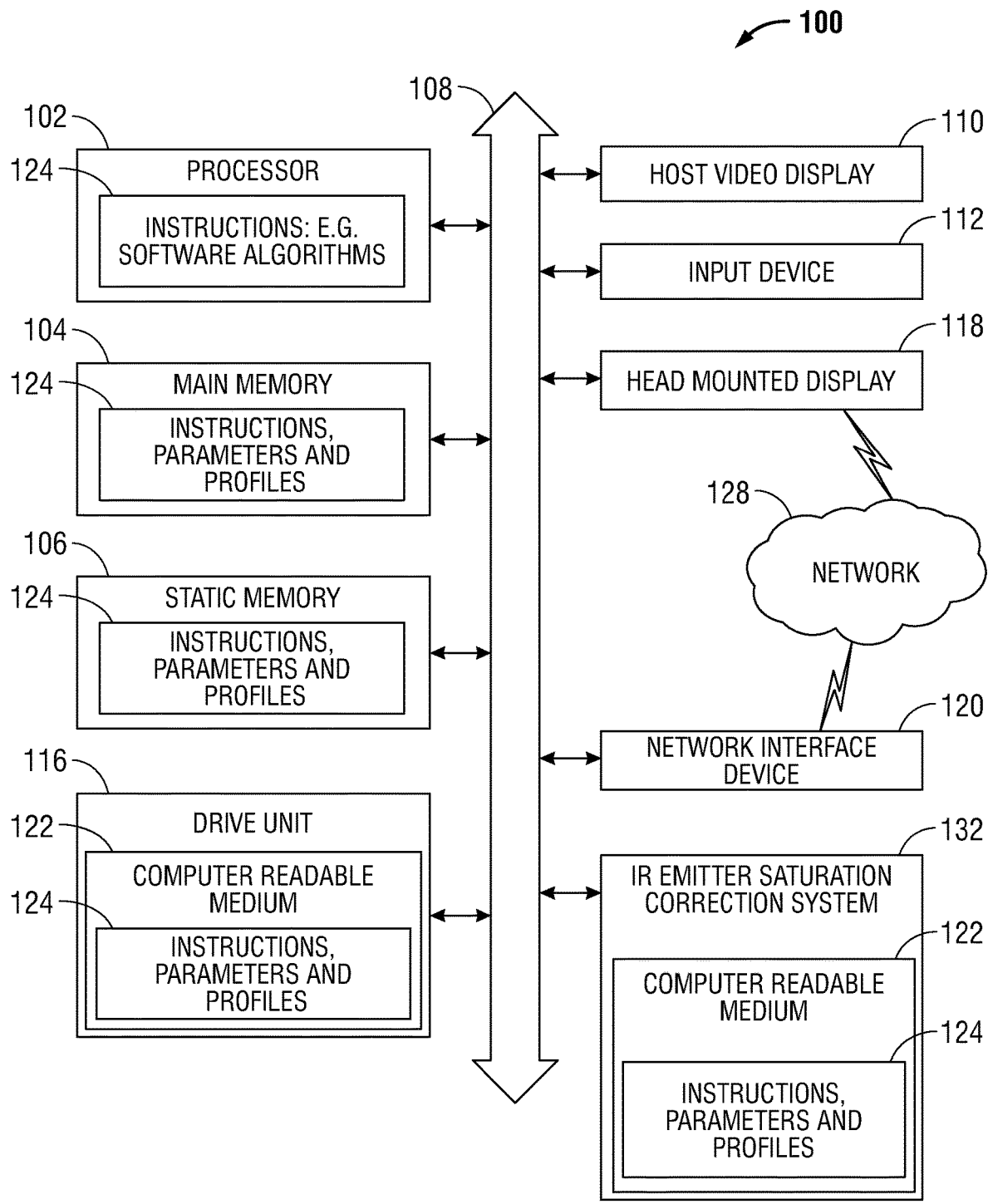
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Head mounted display devices, wearable around the user's head and/or eyes and having the capability of reflecting projected images and/or allowing the user to see through it may be used with augmented or virtual reality display systems. Head mounted display devices capable of generating augmented reality (AR) and/or virtual reality (VR) user interfaces are finding widespread use in workplaces. Modalities and applications such as AR/VR assisted construction, design and engineering, and first responder efforts are gaining in popularity along with AR/VR in the gaming industry.

In order to project images within the headset such that they are incorporated within the actual or virtual reality surrounding the headset, a simultaneous localization and mapping (SLAM) process may be employed in order to identify the position of the headset with respect to its surrounding environment, model the surrounding environment as viewed from the perspective of the headset wearer, and render the modeled image in a three-dimensional environment matching the surrounding real-world environment. Measurements of distances between the headset and landmarks or objects in its surrounding environment may be used in such SLAM processes to identify the position of the headset in its environment.

Infrared emitters and sensors housed within or mounted on the exterior surfaces of the headset are commonly used in the art to measure such distances. In such systems, a plurality of IR emitters are used to project an IR light pattern outward from the wearable headset toward objects in its surrounding environment, and a camera captures an image of the surrounding area. The depth of surfaces of nearby objects may be determined by analyzing the way in which the pattern is distorted as it reaches surfaces of varying distances from the headset. The accuracy of depth measurements gathered in such a way depends heavily on the ability to identify each of the IR lights within the emitted pattern. Over saturation or under saturation of the captured image of the pattern can impact the ability to identify each of these lights. Saturation describes the difference between a colored light (e.g. infrared) and a gray light having the same brightness. Over saturation in a captured image exaggerates this difference while under saturation minimizes this difference. Thus, over or under saturation may affect the ability to differentiate the infrared light emitted from the IR emitter from the surrounding ambient light, or to determine the borders of the infrared light.

Headset infrared emitters in previous incarnations emitted infrared light at a constant intensity determined during a calibration exercise occurring prior to an active user session. Such calibration sessions attempt to avoid over saturation and under saturation by optimizing the intensity at which the light is emitted. This kind of optimization during a calibration session occurring prior to a user session does not account for addition or removal of other light sources during the user session following the calibration. As the popularity of headsets for AR/VR environments increases, headsets are increasingly being used by two or more users located nearby one another during collaborative AR/VR sessions. Consequently, infrared emitters from two separate headsets in such situations may simultaneously emit light toward the same object in the environment surrounding the two headsets. If either of these headsets have been calibrated to operate alone (not in the same immediate space as the other headset), this may cause significant oversaturation of the images captures by that headset's camera, adversely affecting the accuracy of depth measurements. Such over saturation may be avoided by decreasing the intensity at which one or more emitters emits light. In the opposite situation, two or more headsets may have been calibrated to operate in the same immediate space as one another. In such a situation, the intensity at which each of the emitters emits light may be decreased during calibration in order to account for the fact that several emitters will be emitting light toward the same object. In such a situation, if one of the headsets is later turned off during the user session, the image captured by the remaining headset may be under saturated, thus prompting a need to increase intensity of one or more remaining emitters. A system is needed that can adaptively optimize the intensities of one or more of IR emitters to adaptively account for lighting changes occurring during a user session.

Embodiments of the present disclosure address this issue by iteratively adjusting the intensity of light emitted by one or more IR emitters based on determined under or over saturation of three-dimensional images used in SLAM frames. An IR emitter saturation correction system in embodiments of the present disclosure may determine whether an image is over or under saturated by comparing histogram brightness values for an image captured during a calibration phase to an image captured during a user session. Each pixel associated with an identified landmark in the later captured image having an intensity (as measured in the histogram) greater or lesser than the brightness associated with that same pixel in the calibration histogram by a preset percentage may be identified as a potentially over or under saturated pixel. If the percentage of pixels associated with a given landmark that are identified as over or under saturated meets a threshold value, that landmark may be identified as over or under saturated, and the distance measurements between that landmark and the headset may fall outside minimum accuracy tolerances. In such a scenario, the inaccuracy of those measurements may impede the ability to track that landmark between consecutive SLAM frames, and the position of the headset with respect to its surrounding environment may become unknown during a user session. If the ratio of the potentially over or under saturated landmarks to the total number of landmarks in an image meets or exceeds a preset threshold value, this may indicate the later-captured image is over or under saturated sufficiently to impact ability to track landmarks between SLAM frames. In such a scenario, the intensity at which one or more IR emitters are emitting light toward the landmarks identified as over or under saturated may need to be adjusted to correct saturation. Such a determination of whether a sufficient proportion of landmarks are identified as over or under saturated so as to prompt adjustment of one or more IR emitters may be performed in an embodiment at regular intervals throughout a user session.

Such over or under saturation may be caused by only one emitter emitting light at an intensity greater or less than an optimal value, or by multiple emitters doing so. In order to determine a solution to this over or under saturation, the IR emitter saturation correction system may first identify individual emitters affecting the intensities associated with the potentially over or under saturated landmarks. In such a way, the IR emitter saturation correction system may isolate one or more IR emitters for adjustment in order to manage the saturation of the pixel region containing the potentially over or under saturated pixels.

Once one or more IR emitters identified as emitting light toward the identified over or under saturated landmark have been identified, the IR emitter saturation correction system may determine whether the landmarks are over saturated or under saturated, and to what degree. For over saturated landmarks, the IR emitter saturation correction system may set the intensity of the IR emitters needing adjustment such that the pixels affected by those IR emitters produce an intensity value closer to the minimum measured intensity than the current intensity. Similarly, for under saturated images, the IR emitter saturation correction system may set the intensity of the IR emitters needing adjustment such that the pixels affected by those IR emitters produce an intensity value closer to the maximum measured intensity than the current intensity.

This binary divide-and-conquer process may be repeated over several frames until the image is no longer under or over saturated, or until a threshold number of under or over saturated SLAM frames are consecutively generated. If the binary divide-and-conquer approach fails to correct the over or under saturation of landmarks over a preset number of consecutively generated SLAM frames, it is likely the binary divide-and-conquer method will not converge toward a solution, and the IR emitter saturation control system may reset any IR emitter associated with a landmark that is consistently under or over saturated across the preset number of consecutively generated SLAM frames back to its calibration settings. In such a way, the IR emitter saturation correction system may dynamically optimize the brightness of each of the IR emitters onboard a headset individually to account for the introduction or removal of other infrared lights emitted from nearby headsets or of new environmental lighting conditions.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses 108 operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), a graphics processing unit (GPU), control logic or some combination of the same. Any of the processing resources may operate to execute code that is either firmware or software code. Moreover, the information handling system 100 can include memory such as main memory 104, static memory 106, computer readable medium 122 storing instructions 124 of the IR emitter saturation control system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a head mounted display 118, which may display images using, for example, a curved mirror based reflection, a waveguide based method or a light guide based method. Waveguide methods may further include, but may not be limited to diffraction optics, holographic optics, polarized optics, and reflective optics. These are just examples, and it is contemplated the head mounted display may use any method that reflects projected images in order to create an augmented reality. Additionally, the information handling system 100 may include an input device 112, such as a keyboard, and/or a cursor control device, such as a mouse, touchpad, or gesture or touch screen input. The information handling system 100 can also include a disk drive unit 116.

The information handling system 100 may also include an infrared emitter power optimization system 132 that may be operably connected to the bus 108. The IR emitter saturation control system 132 computer readable medium 122 may also contain space for data storage. The IR emitter saturation control system 132 may perform tasks related to optimizing intensity at which each of a plurality or IR emitters emit light in order to adaptively avoid over or under saturation of images captured by a camera caused by changing environmental lighting conditions. In an embodiment, the IR emitter saturation control system 132 may communicate with the main memory 104, the processor 102, the alpha-numeric input device 112, head mounted display 118, and the network interface device 120 via bus 108, and several forms of communication may be used, including ACPI, SMBus, a 24 MHZ BFSK-coded transmission channel, or shared memory.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The network interface device 120 may also provide connectivity via Bluetooth to a nearby information handling system, such as a desktop or laptop information handling system, or to a tablet or mobile device. In some embodiments, the head mounted display 118 may be accessed via the network 128 rather than via bus 108. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The information handling system 100 can include a set of instructions 124 that can be executed to cause the computer system to perform any one or more of the methods or computer based functions disclosed herein. For example, instructions 124 may execute an IR emitter saturation control system 132, software agents, or other aspects or components. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and the IR emitter saturation control system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including a calibration look-up table. The disk drive unit 116 and static memory 106 also contain space for data storage. Further, the instructions 124 may embody one or more of the methods or logic as described herein. For example, instructions relating to the IR emitter saturation control system 132 software algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the IR emitter saturation control system 132 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The IR emitter saturation control system 132 and the drive unit 116 may include a computer-readable medium 122 such as a magnetic disk, or a static memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
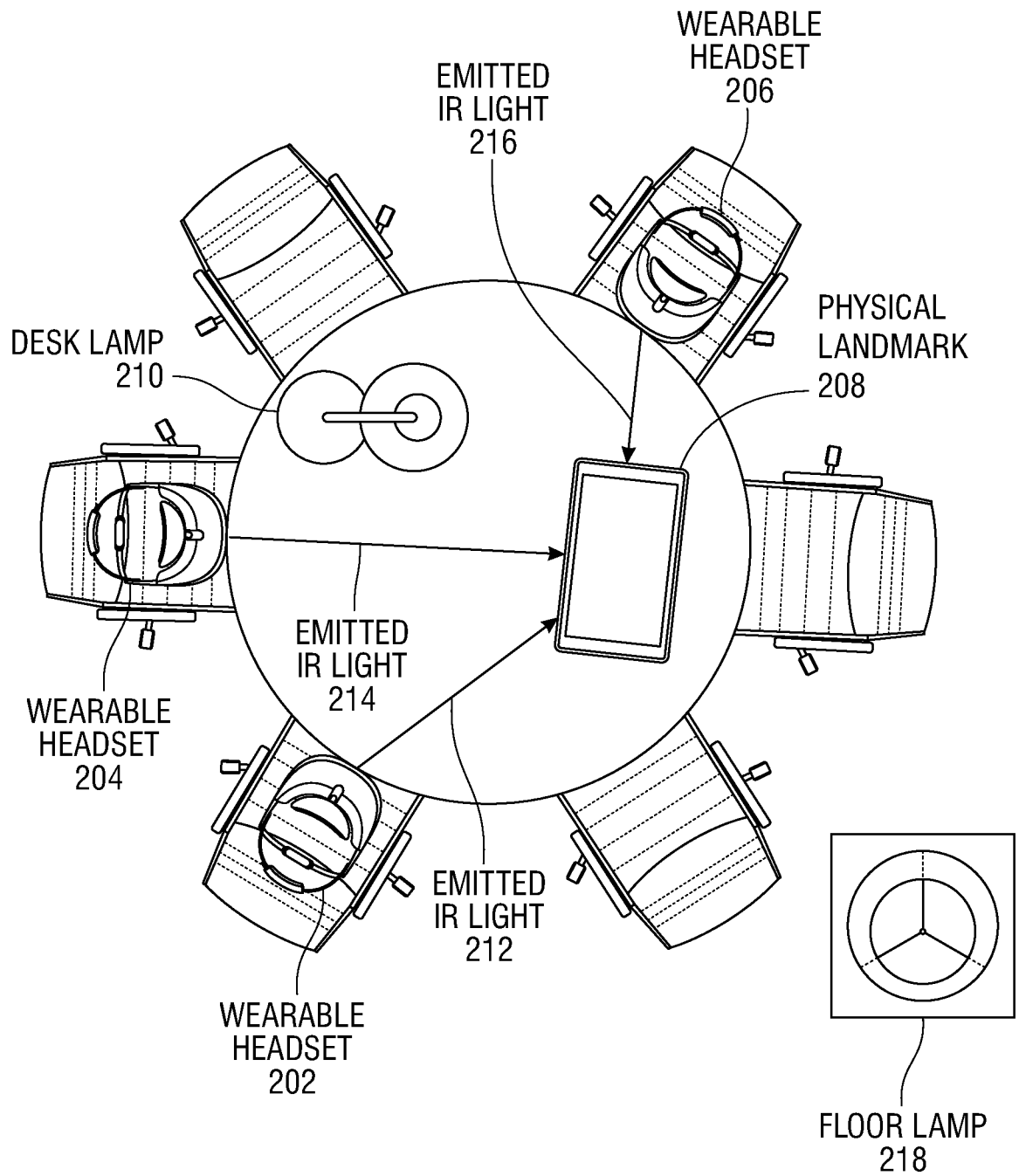
FIG. 2 is a graphical diagram illustrating a collaborative user session involving a plurality of wearable headsets according to an embodiment of the present disclosure.

FIG. 2 is a graphical diagram illustrating a collaborative user session involving a plurality of wearable headsets emitting infrared light toward the same physical object according to an embodiment of the present disclosure. As described herein, head mounted display devices, wearable around the user's head and/or eyes and having the capability of reflecting projected images and/or allowing the user to see through it may be used with augmented or virtual reality display systems. As the popularity of headsets for AR/VR environments increases, headsets are increasingly being used by two or more users located nearby one another during collaborative AR/VR sessions. For example, users of wearable headset 202, wearable headset 204, and wearable headset 206 may engage in a collaborative AR/VR user session, at the same meeting table. During the user session, each of the users may view a rendered image, projected within each of their wearable headsets 202-206 to appear at the location of the physical landmark 208.

The physical landmark 208 may take any shape or be any object. In one example embodiment, the physical landmark 208 may be some sort of user interface (e.g. tablet computer or other type of computing display device). If the user session in such an embodiment is an augmented reality session, the projected image may be integrated into the surrounding environment to appear as if it is coplanar with the interface 208, or projected perpendicularly from its surface. In a collaborative AR session in such an embodiment, each of the head mounted displays within the headsets 202-206 may project the same or similar image (e.g. adjusted for differences in position between headsets) such that each of the participants may interact with the projected image and with the user interface 208. In other embodiments, the physical landmark 208 may be an inanimate object. In such an embodiment, each of the headsets 202-206 may project images such that they do not occupy the same physical space as the landmark 208.

In order to project such images in any of these described embodiments, a SLAM process may be employed in order to identify the position of each of the headsets 202-206 with respect to its surrounding environment (e.g. physical landmark 208), model the surrounding environment as viewed from the perspective of the headset wearer, and render the modeled image in a three-dimensional environment matching the surrounding real-world environment (e.g. such that projected images do not occupy the same space as physical landmark 208 and/or interact accurately with physical landmark 208). Measurements of distances between headsets 202-206 and physical landmark 208 may be used in a SLAM process in an embodiment to identify the position of the headsets 202-206 in their shared environment.

Infrared emitters and sensors housed within or mounted on the exterior surfaces of the headsets 202-206 may measure such distances in an embodiment. Infrared emitters and sensors may be mounted in all directions around the exterior surface of the wearable headsets 202, 204, or 206 in some embodiments. In other embodiments, only portions of the exterior surfaces of the wearable headsets may have infrared emitters and sensors or cameras. For example, wearable headset 202 may emit IR light 212 in a pattern toward the physical landmark 208, wearable headset 204 may emit IR light 214, and wearable headset 206 may emit IR light 216 toward the physical landmark 208. Cameras mounted to each of the headsets 202-206 may then capture an image of each of the IR lights 202-206 reflecting off the surfaces of the physical landmark 208. If the surrounding environment further includes other ambient light sources, the cameras will also detect illumination from the physical landmark 208 reflecting such ambient light. For example, if desk lamp 210 and/or floor lamp 218 are turned on, the physical landmark 208 in an embodiment may reflect ambient light generated by the lamps 210 and 218.

The depth of surfaces of nearby objects may be determined by analyzing the way in which the pattern of emitted IR light is distorted as it reaches surfaces of varying distances from the headset. For example, wearable headset 202 may determine the depth of the physical landmark 208 by analyzing the way in which the pattern of emitted IR light 212 is distorted as it reaches the surfaces of physical landmark 208. Similarly, wearable headset 204 may determine the depth of the physical landmark 208 by analyzing the way in which the pattern of emitted IR light 214 is distorted as it reaches the surfaces of physical landmark 208, and wearable headset 206 may determine the depth of the physical landmark 208 by analyzing the way in which the pattern of emitted IR light 216 is distorted as it reaches the surfaces of physical landmark 208. The accuracy of depth measurements gathered in such a way depends heavily on the ability to identify each of the IR lights within the emitted patterns 212, 214, and 216. Over saturation or under saturation of the captured image of the pattern can impact the ability to identify each of these lights. Over or under saturation may be avoided in an embodiment by adjusting the intensity at which one or more IR emitters of one or more headsets 202-206 emit light.

Headset infrared emitters in previous incarnations emitted infrared light at a constant intensity determined during a calibration exercise occurring prior to an active user session, and failed to account for addition or removal of other light sources during the user session following the calibration. The IR emitter saturation correction system in an embodiment may operate onboard one or more of wearable headsets 202-206 to adaptively adjust the intensity of light emitted from one or more IR emitters to avoid under or over saturation due to changing lighting conditions during a user session. For example, wearable headset 202 in an embodiment may be calibrated at a time when wearable headsets 204-206 are not emitting IR light. In such an embodiment, if either the wearable headset 204 or headset 206 begins to emit IR light within the field of view of the camera onboard headset 202, the IR emitter saturation correction system may determine the IR light 214 or 216 emitted from headset 204 or 206, respectively, is over saturating the image captured by the camera onboard headset 202. In such an embodiment, the IR emitter saturation correction system may adjust the intensity at which one or more IR emitters are emitting IR light onboard the wearable headset 202 in order to decrease the saturation of the captured image.

As another example, wearable headset 202 in an embodiment may be calibrated at a time when wearable headsets 204-206 are emitting IR light within the field of view of the camera onboard headset 202. In such an embodiment, if one or both the wearable headsets 204 or 206 stops emitting IR light, the image captured by the camera onboard the wearable headset 202 may be under saturated. In such an embodiment, the IR emitter saturation correction system may adjust the intensity at which one or more IR emitters are emitting IR light onboard the wearable headset 202 in order to increase the saturation of the captured image.

As yet another example, wearable headset 202 in an embodiment may be calibrated at a time when desk lamp 210 is turned on, and floor lamp 218 is turned off. In such an embodiment, if the desk lamp 210 is later turned off, or floor lamp 218 is later turned on, portions of the image captured by the camera onboard the headset 202 may become under saturated, over saturated, or both. In such an embodiment, the IR emitter saturation correction system may adjust the intensity of IR emitters associated with the over saturated pixels to decrease the saturation of those pixels, while simultaneously adjusting the intensity of IR emitters associated with the under saturated pixels to increase the saturation of those pixels.

In each of these embodiments, the IR emitter saturation corrections system may adjust the intensity of one or more individual IR emitters iteratively over a period of time using a binary divide-and-conquer approach until the image saturation falls within preset bounds. In such a way, the IR emitter saturation calibration system in an embodiment may adaptively adjust the intensities of individual IR emitters onboard a headset to account for changing lighting conditions during a user session. Such a solution does not require communication or synchronization between wearable headsets or between a wearable headset operating the IR emitter saturation correction system and a nearby light source.

Figure 3:
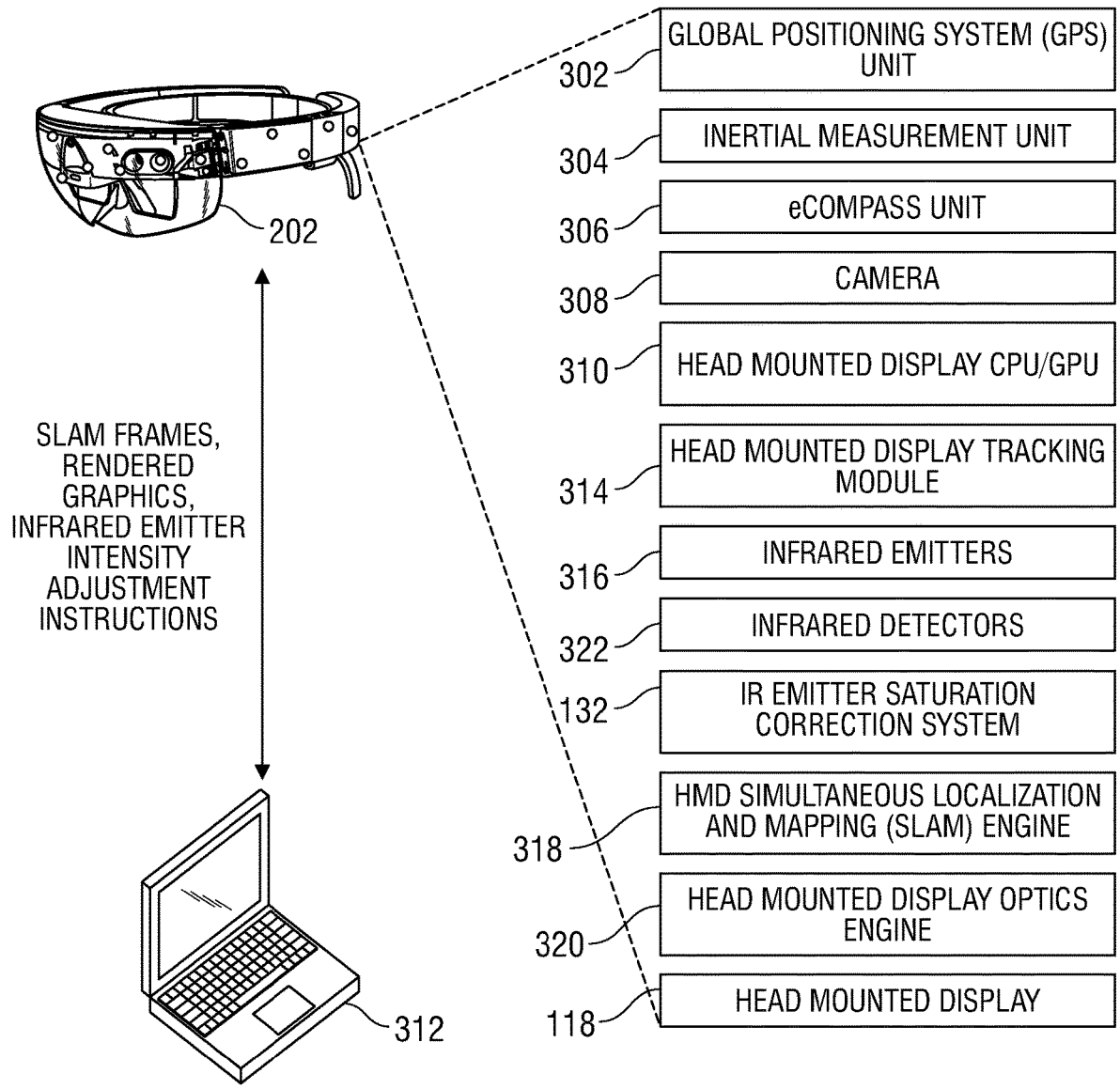
FIG. 3 is a block diagram illustrating components of a head mounted display headset to an embodiment of the present disclosure.

FIG. 3 is a block diagram illustrating components of a head mounted display headset incorporating an IR emitter saturation control system according to an embodiment of the present disclosure. In an embodiment, one or more subsystems within a head mounted display information handling system 202 may execute code instructions of the IR emitter saturation control system, or may operate in tandem with the IR emitter saturation control system.

The head mounted display information handling system 202 in an embodiment may include subsystems for measurement of its position and/or orientation. For example, the head mounted display information handling system 202 in an embodiment may include positional sensors such as a global positioning system (GPS) unit 302, an inertial measurement unit (IMU) 304, an e-Compass unit 306, and/or other positional measurement tools such as an accelerometer, a capacitive transducer, a hall effect sensor, a laser doppler vibrometer, a multi-axis displacement transducer, a potentiometer, or a confocal chromatic sensor. Other positional sensors are also contemplated, including a capacitive displacement sensor, an eddy-current sensor, an ultrasonic sensor, a grating sensor, an inductive non-contact position sensor, a linear variable differential transformer, a photodiode array, a piezo-electric transducer, a proximity sensor, a rotary encoder, a seismic displacement pick-up, and a string potentiometer, along with any other positional sensors developed in the future. The positional sensors (e.g. GPS unit 302, IMU 304, and/or eCompass unit 306) in an embodiment may operate to measure location coordinates (x, y, z) of the head mounted display information handling system 202, as well as orientation (θ), velocity, and/or acceleration. Velocity, acceleration, and trajectory of the head mounted display information handling system 202 in such an embodiment may be determined by comparing a plurality of measured location coordinates and orientations taken over a known period of time, or may be measured directly by onboard positional sensor such as an accelerometer.

The head mounted display information handling system 202 may also be capable of capturing video or still images of its surrounding environment, which may include one or more identifiable landmarks. For example, the head mounted display information handling system 202 may include a head mounted display camera 308. The camera 308 may capture a two dimensional image of the surrounding environment, which may be combined with distance measurements gathered by a plurality of IR emitters and detectors to generate a three-dimensional image of the surrounding environment. The head mounted display camera 308 in an embodiment may be, for example, a stereo triangulation camera, an Infrared (IR) camera, a sheet of light triangulation camera, a structured light camera, a time-of-flight camera, an interferometry camera, a coded aperture camera, a RGB digital camera, an infrared digital camera, a telephoto lens digital camera, a fish-eye digital camera, a wide-angle digital camera, a close-focus digital camera, or any other type of camera. The three-dimensional image captured by the head mounted display three-dimensional camera 308 in an embodiment may be used to determine the position and orientation of the head mounted display with respect to the one or more landmarks.

The head mounted display information handling system 202 in an embodiment may further include a head mounted display CPU 310, which may execute instructions of the IR emitter saturation control system 132. Such instructions executed by the head mounted display CPU 310 in an embodiment may include writing IR emitter intensity adjustment instructions for one or more infrared emitters to infrared emitter firmware controlling the power draw limits for each of the plurality of infrared emitters. The IR emitter intensity adjustment instructions in such an embodiment may be generated by the IR emitter saturation control system 132 operating onboard the head mounted display information handling system 202. In another embodiment, the IR emitter intensity adjustment instructions may be generated by the host laptop/desktop information handling system 312 and transmitted to the head mounted display information handling system 202 via a network adapter.

The head mounted display CPU 310 may also transmit an image of the surrounding environment captured by the three-dimensional camera 308, the measured position (x, y, z), orientation (θ), velocity, and/or acceleration of the head mounted display information handling system 202 to the wirelessly connected laptop or desktop information handling system 312 via a network adapter in an embodiment. The CPU 310 may also receive SLAM frames indicating the positions of the head mounted display information handling system 202 and one or more identified landmarks in the surrounding environment from the remotely connected laptop or desktop information handling system 312 via the network adapter.

In other embodiments, the processor 310 may be a graphics processing unit (GPU). The GPU 310 in an such an embodiment may determine the position/orientation of identified landmarks with respect to the head mounted display information handling system 202 through analysis of the positional information measured in the image captured by the three-dimensional camera 308 in combination with an identification by the head mounted display tracking module 314 of the one or more landmarks. In some embodiments, such positional/orientation information may be received at the CPU/GPU 310 from the remotely located laptop or desktop information handling system 312 via a network adapter.

The head mounted display information handling system 202 in an embodiment may further include one or more subsystems capable of identifying one or more landmarks within three-dimensional image information. For example, the head mounted display information handling system 202 may include a head mounted display tracking module 314. The head mounted display tracking module 314 in an embodiment may access the three-dimensional image information of one or more nearby landmarks captured by the head mounted display three-dimensional camera 308. In some embodiments, the tracking module 314 may identify the physical boundaries of one or more potential landmarks within the three-dimensional image captured by the head mounted display three-dimensional camera 308. Once the physical boundaries of the landmarks are identified by the tracking module 314 in an embodiment, the distance between these identified items and the head mounted display 202 may be determined.

A plurality of infrared emitters 316 may be mounted along the exterior of the head mounted display information handling system 202 in an embodiment. Each infrared emitter 316 (e.g. an infrared light emitting diode) in an embodiment may operate to emit infrared light toward the environment surrounding the head mounted display information handling system 202. In some embodiments, the light emitted from each emitter 316 may be patterned, and each emitter may emit the same pattern, or different emitters may emit different patterns. The intensity of light emitted from each emitter 316 in an embodiment may be controlled by the CPU 310, a controller (not shown), or an integrated circuit or chip (not shown) executing firmware instructions of the emitter 316. Such firmware may also identify the position of each emitter 316 along the exterior of the head mounted display information handling system 202 (e.g. position with respect to field of view of headset).

The head mounted display information handling system 202 may further include one or more infrared detectors 322 capable of detecting infrared light emitted from the plurality of infrared emitters 316 reflecting off the surfaces of landmarks or objects within the environment surrounding the head mounted display information handling system 202. IR detectors 322 in an embodiment may be composed of pyro-electric materials capable of generating an electrical current based on received or detected heat. Electrical currents generated by the plurality of IR detectors 322 in an embodiment may be used to determine a length of time during which light emitted from an IR emitter 316 traveled toward an object in the environment surrounding the headset 202, then travelled back toward the infrared detector 322 upon reflection.

The head mounted display information handling system 202 may further include one or more subsystems capable of mapping the positions/orientations of the head mounted display information handling system 202 and one or more identified landmarks within a virtual three-dimensional environment in an embodiment. For example, the head mounted display information handling system 202 may include a head mounted display (HMD) simultaneous localization and mapping (SLAM) engine 318. The HMD SLAM engine 318 in an embodiment may access the position/orientation information for the one or more landmarks with respect to the head mounted display information handling system 202 generated or received by the CPU/GPU 310, and use this information to generate a three-dimensional virtual map of the head mounted display information handling system 202 and its surrounding environment, including the one or more identified landmarks. In other embodiments, the CPU/GPU 310 may receive one or more SLAM frames including three-dimensional virtual maps of the head mounted display information handling system 202 and its surrounding environment from the remotely located laptop or desktop information handling system 312 via a network adapter.

In an embodiment, one or more subsystems capable of rendering an image of the surrounding environment from the perspective of the head mounted display information handling system 202 may also be included onboard the head mounted display information handling system 202. For example, the head mounted display information handling system 202 may include a head mounted display optics engine 320, which may access the three-dimensional virtual map generated by the HMD SLAM engine 318 or received from the remotely located information handling system 312 in an embodiment. The head mounted display optics engine 320 in an embodiment may render a three-dimensional image of the surrounding environment including the identified one or more landmarks based on the location/orientation of the landmarks with respect to the head mounted display information handling system 202 within the virtual map, as with a virtual reality environment. In other embodiments, the head mounted display optics engine 320 may render a three-dimensional image of an object projected to appear as if it is incorporated within the environment surrounding the head mounted display information handling system 202, as with an augmented reality environment.

The head mounted display information handling system 202 in an embodiment may further include one or more subsystems capable of and displaying the rendered image of the surrounding environment within the head mounted display information handling system. For example, the head mounted display information handling system 202 may include a head mounted display 118, capable of displaying the image (e.g. virtual reality image, or augmented reality image) rendered by the head mounted display optics engine 320.

Figure 4:
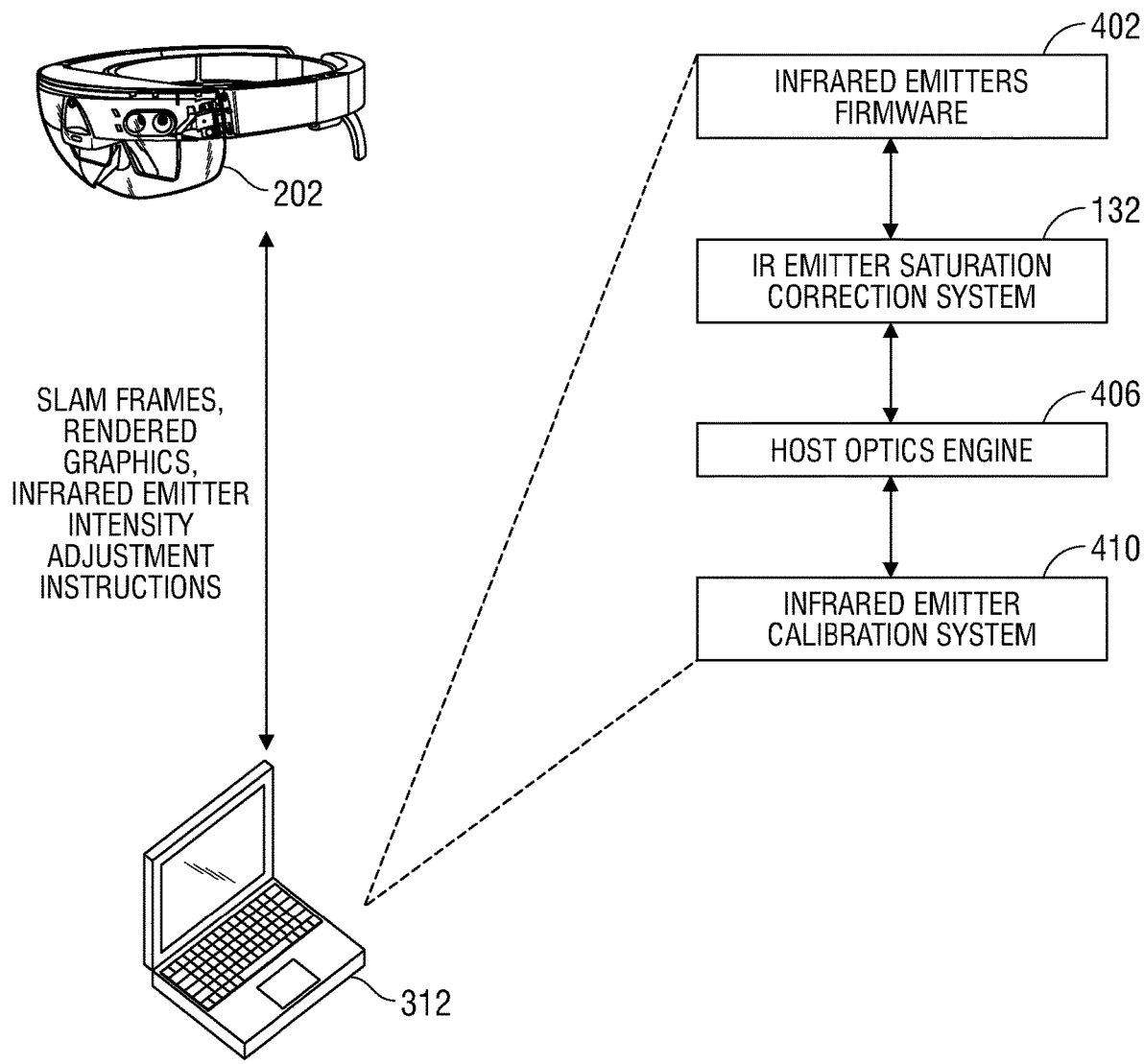
FIG. 4 is a block diagram illustrating components of an information handling system wirelessly connected to a head mounted display headset according to an embodiment of the present disclosure.

FIG. 4 is a block diagram illustrating components of a host information handling system incorporating a calibration look-up repository connected to a head mounted display headset according to an embodiment of the present disclosure. The information handling system 312 in some embodiments may be located remotely from and in wireless communication with the head mounted display information handling system 202. In other embodiments, the host information handling system 312 may be operably connected to the head mounted display information handling system 202 via a single cord (e.g. USB-C). For example, the information handling system 312 may receive SLAM frames generated by the head mounted display information handling system 202, and may transmit rendered graphics, and infrared emitter intensity adjustment instructions to the head mounted display information handling system 202.

The host information handling system 312 in an embodiment may include infrared emitter firmware 402 operating to control power supplied to each of a plurality of infrared emitters mounted upon the head mounted display information handling system 202. Such firmware 402 may include individual instructions for each emitter to emit light according to a brightness value determined to optimize saturation of captured images given changing lighting conditions.

An infrared emitter power optimization system 132 may also operate fully or partially onboard the host information handling system 312 in an embodiment. The infrared emitter power optimization system 132 in an embodiment may operate to determine an optimal brightness at which each of a plurality of IR emitters may emit light in order to negate over or under saturation caused by changing lighting conditions during a user session. Instructions for the operation of one or more IR emitters may be generated based on these determinations, and written to the firmware 402 in an embodiment. In other embodiments, such instructions may be transmitted from the host information handling system 312 to the head mounted display information handling system 202 to be written to firmware located onboard the head mounted display information handling system 202. In still other embodiments, both the infrared emitter power optimization system 132 and the infrared emitters firmware 402 may operate completely onboard the head mounted display information handling system 202 and the CPU of the head mounted display information handling system may operate to write the instructions determined by the infrared emitter power optimization system 132 to the firmware 402.

In an embodiment, one or more subsystems capable of rendering an image of the surrounding environment from the perspective of the head mounted display information handling system 202 may also be included onboard the host information handling system 312. For example, the host information handling system 312 may include a host optics engine 320, which may render a three-dimensional image based on a SLAM frame received from the head mounted display information handling system 202. Such rendered graphics may then be transmitted back for display within the head mounted display information handling system 202 in an embodiment.

The host information handling system 312 in an embodiment may further include an infrared emitter calibration system 410, which may operate to determine a calibration brightness at which each IR emitter should emit light in order to optimize saturation of an image captured during a calibration session. Such optimization during a calibration session may not account for changes in lighting conditions occurring following the calibration session. Rather, the IR emitter saturation correction system accounts for such changes adaptively, as they occur during a user session following the calibration session.

Figure 5:
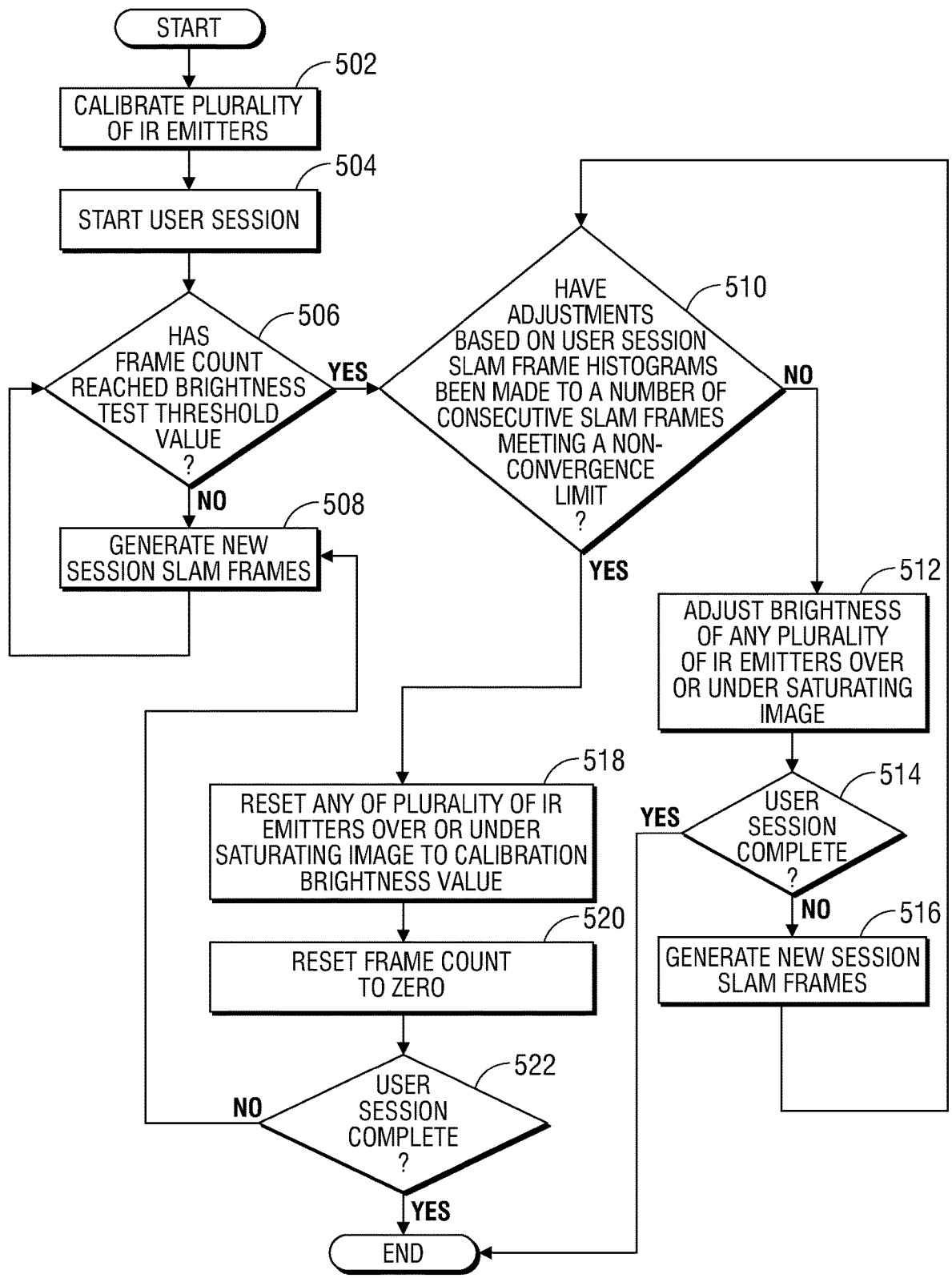
FIG. 5 is a flow diagram illustrating a method of adaptively adjusting the brightness of one or more IR emitters during a user session according to an embodiment of the present disclosure.

FIG. 5 is a flow diagram illustrating a method of adaptively adjusting the brightness of one or more IR emitters during a user session to account for changing environmental lighting conditions according to an embodiment of the present disclosure. As described herein, over saturation or under saturation of a captured image of a pattern of infrared lights emitted by a plurality of emitters onboard a headset can impact the ability to identify each of these lights, which may decrease the accuracy of distance measurements between the headset and objects in its surrounding environment. FIG. 5 provides a method of adaptively optimizing the intensities of one or more IR emitters to account for lighting changes occurring after a calibration session.

At block 502, the IR emitter saturation control system in an embodiment may calibrate a plurality of IR emitters. Such calibration may involve adjusting the brightness or intensity at one or more IR emitters emit infrared light in order to avoid over saturation and under saturation of an infrared image captured by a camera onboard the headset housing the emitters. For example, in an embodiment described with reference to FIG. 2, wearable headset 202 may be calibrated at a time when wearable headsets 204-206 are not emitting IR light. In such an embodiment, the infrared emitters mounted on the exterior of wearable headset 202 may emit light at a relatively high intensity since headset 202 is the only headset operational during the calibration period. As another example, wearable headset 202 in an embodiment may be calibrated at a time when wearable headsets 204-206 are emitting IR light within the field of view of the camera onboard headset 202. In such an embodiment, the infrared emitters mounted on the exterior of wearable headset 202 may emit light at a relatively lower intensity in order to avoid oversaturation due to infrared light being emitted from three separate headsets 202-206 onto the same area (e.g. onto landmark 208). As yet another example, wearable headset 202 in an embodiment may be calibrated at a time when desk lamp 210 is turned on, and floor lamp 218 is turned off. In such an embodiment, a portion of the infrared emitters emitting light toward the side of the landmark 208 closest to the desk lamp 210 may be calibrated to emit relatively lower intensity light in order to account for illumination from the desk lamp 210, while a portion of the infrared emitters emitting light toward the side of the landmark 208 closest to the floor lamp 218 may be calibrated to emit relatively higher intensity light. This kind of optimization during a calibration session occurring prior to a user session in an embodiment may not account for addition or removal of other light sources during the user session following the calibration.

A user session may begin at block 504 in an embodiment. A user session may be a session in which the images are projected within the wearable headset, and may follow the calibration period. In order to project images within the headset during a user period such that they are incorporated within the actual or virtual reality surrounding the headset, a SLAM process may be employed to identify the position of the headset with respect to its surrounding environment, model the surrounding environment as viewed from the perspective of the headset wearer, and render the modeled image in a three-dimensional environment matching the surrounding real-world environment. A SLAM frame may include a compilation of an image captured by a camera (e.g. RGB, infrared) combined with depth information describing measured distances between the camera mounted on the headset and one or more landmarks or physical objects within the surrounding environment. A frame count may record the number of SLAM frames generated during a user session, or from a specific point during a session. For example, the frame count may be set at zero at the beginning of a user session and may increment by a value of one each time a new SLAM frame is generated. As another example, a frame count may be set to zero at any given point during a user session by the IR emitter saturation correction system in an embodiment.

At block 506, the IR emitter saturation correction system in an embodiment may determine whether the frame count has reached a brightness test threshold value. The IR emitter saturation correction system in an embodiment may perform a brightness test at regular intervals during a user session to adaptively adjust brightness levels of one or more IR emitters in order to avoid under or over saturation of captured images underlying SLAM frames. A regular interval at which such a brightness test may be performed may occur after a preset number of frames have been generated during a user session. This preset brightness test threshold value in an embodiment may have any value and may be preset prior to or during calibration. For example, the preset brightness test threshold value in an embodiment may be ten frames. In such an embodiment, the IR emitter saturation correction system may perform a brightness test to determine if adjustments to the brightness at which one or more IR emitters emit IR light every ten frames during the user session. If the frame count has not reached the brightness test threshold value, the method may proceed to block 508. If the frame count has reached the brightness test threshold value, the method may proceed to block 510 for determination as to whether an adjustment to one or more IR emitters is needed.

The IR emitter saturation control system in an embodiment may generate a new session SLAM frame at block 508 if the current frame count has not yet reached a brightness test threshold value. For example, in an embodiment in which the brightness test threshold value is ten frames, and only five SLAM frames have been generated during the current user session, the IR emitter saturation control system may generate a new SLAM frame without performing a brightness test on the latest SLAM frame. As another example, the IR emitter saturation control system may similarly generate a new SLAM frame without performing a brightness test on the latest SLAM frame in an embodiment if the brightness test threshold value is ten frames, and only five SLAM frames have been generated since the IR emitter saturation control system has changed the brightness values of one or more IR emitters. Generating a new session SLAM frame may also increase the frame count in an embodiment. The method may then proceed back to block 506 to determine if the newly incremented frame count now meets the brightness test threshold value. This loop may be repeated until the frame count reaches the brightness test threshold value and the method proceeds to block 510 in an embodiment.

At block 510, the IR emitter saturation correction system in an embodiment may determine whether adjustments based on user session SLAM frame histograms have been made to a number of consecutive SLAM frames meeting a non-convergence limit. The IR emitter saturation control system in an embodiment may perform adjustments to the brightness of IR emitters in an embodiment if a captured image underlying a SLAM frame is sufficiently over or under saturated to disrupt the ability to identify one or more landmarks. If the image captured by the camera is either over or under saturated, the measured distances between the camera and the one or more landmarks may be less accurate than if the image were saturated correctly. The method by which an image underlying a SLAM frame may be identified as over or under saturated in such a way is described in greater detail below with reference to FIG. 7.

Such over or under saturation in an embodiment may occur if the lighting conditions surrounding the headset change during the user session, after calibration of the headset has been completed. For example, in an embodiment described with reference to FIG. 2, headset 202 may be calibrated while headsets 204 and 206 are emitting no infrared light, and wearable headsets 204 and/or 206 may begin to emit IR light within the field of view of the camera onboard headset 202. In such an embodiment, the infrared light from all three headsets 202-206 emitted toward the landmark 208 during the user session, and not anticipated during the calibration session, may cause an infrared image of the landmark 208 captured by a camera onboard the wearable headset 202 to be over saturated.

As another example, the wearable headset 202 in an embodiment may be calibrated to emit light at a relatively lower intensity due to wearable headsets 204-206 also emitting IR light toward the landmark 208, and one or both the wearable headsets 204 or 206 may stop emitting IR light during the user session. In such an embodiment, the relatively lower intensity of light emitted by headset 202, as set during calibration and prior to the change in lighting due to headsets 204 and 206, may cause under saturation of the image of the landmark 208 captured by the camera onboard headset 202 in the absence of light from headsets 204-206.

As yet another example, a portion of the infrared emitters emitting light toward the side of the landmark 208 closest to a desk lamp 210 that is on during the calibration session may be calibrated to emit relatively lower intensity light, while a portion of the infrared emitters emitting light toward the side of the landmark 208 closest to a floor lamp 218 that is turned off during the calibration session may be calibrated to emit relatively higher intensity light. If the desk lamp 210 is later turned off during the user session, a portion of the image captured by the camera onboard the headset 202 may be under saturated due to the unanticipated absence of light from the desk lamp 210. Similarly, if the floor lamp 218 is later turned on during the user session, a portion of the image captured by the camera onboard the headset 202 may be over saturated due to the unanticipated presence of light from the desk lamp 210. In each of these embodiments, adjustments to the intensity at which one or more IR emitters onboard the headset 202 emit light may be needed in order to adjust the saturation of captured images and consequently increase the accuracy of measurements made based on such captured images.

Adjustments to the brightness of one or more IR emitters may involve iteratively adjusting the brightness toward the minimum possible brightness of the IR emitter or toward the maximum possible brightness of the IR emitter over a series of SLAM frames. The degree to which the brightness of a given IR emitter is adjusted toward a minimum or maximum allowable value in each of these iterative loops may be determined based on a histogram analysis of each of the series of SLAM frames in an embodiment. In another aspect of an embodiment, the IR emitter saturation correction system may adjust the brightness value of one or more IR emitters by resetting the brightness for a given IR emitter to the brightness at which it emitted IR light during the calibration phase.

The IR emitter saturation calibration system in an embodiment may employ this latter resetting method when several iterations of the former incremental adjustment method have failed to resolve the over or under saturation. For example, the IR emitter saturation correction system in an embodiment may attempt to incrementally adjust the brightness based on the histogram analysis for a number of consecutive SLAM frames, until the number of consecutive SLAM frames in which the incremental method has been tried reaches a preset non-convergence limit. The preset non-convergence limit in an embodiment may be preset prior to or during the calibration phase, and may have any number. For example, a default value for the preset non-convergence limit may be seven, and it may be adjustable during a calibration stage to have a different value, such as ten or twenty. In an embodiment in which the preset non-convergence limit is seven, the IR emitter saturation correction system may determine whether the incremental adjustment method based on histogram analyses of incoming SLAM frames has been performed for seven consecutive SLAM frames in a row. If such adjustments made based on user session histogram analyses have not yet been made for seven SLAM frames in a row in such an embodiment, the method may proceed to block 512 for an incremental adjustment. If such adjustments based on user session histogram analyses have been made for seven SLAM frames in a row in such an embodiment, this may indicate the incremental adjustment method is not likely to converge toward a properly saturated image, and the method may proceed to block 518.

At block 512, the IR emitter saturation correction system in an embodiment may adjust the brightness of any of the plurality of IR emitters over or under saturating an image based on a histogram analyses of an image captured during the user session. In an embodiment in which the captured image is over saturated, such over saturation may be avoided by decreasing the intensity at which one or more emitters emits light. The determination of which IR emitters may need to be adjusted based on under or over saturation of a region of pixels within an image captured during a user session is described in greater detail with reference to FIG. 6. In an embodiment in which the captured image is under saturated, the intensity at which one or more emitters emit light may need to be increased. For example, in an embodiment described with reference to FIG. 2 in which unanticipated presence of light emitted from headsets 204-206 causes over saturation of an image captured by headset 202, the IR saturation control system in an embodiment may decrease the brightness of one or more IR emitters operating onboard the headset 202. As another example in which unanticipated absence of light from headsets 204-206 causes under saturation of an image captured by headset 202, the IR saturation control system in an embodiment may increase the brightness of one or more emitters operating onboard the headset 202.

Figure 8:
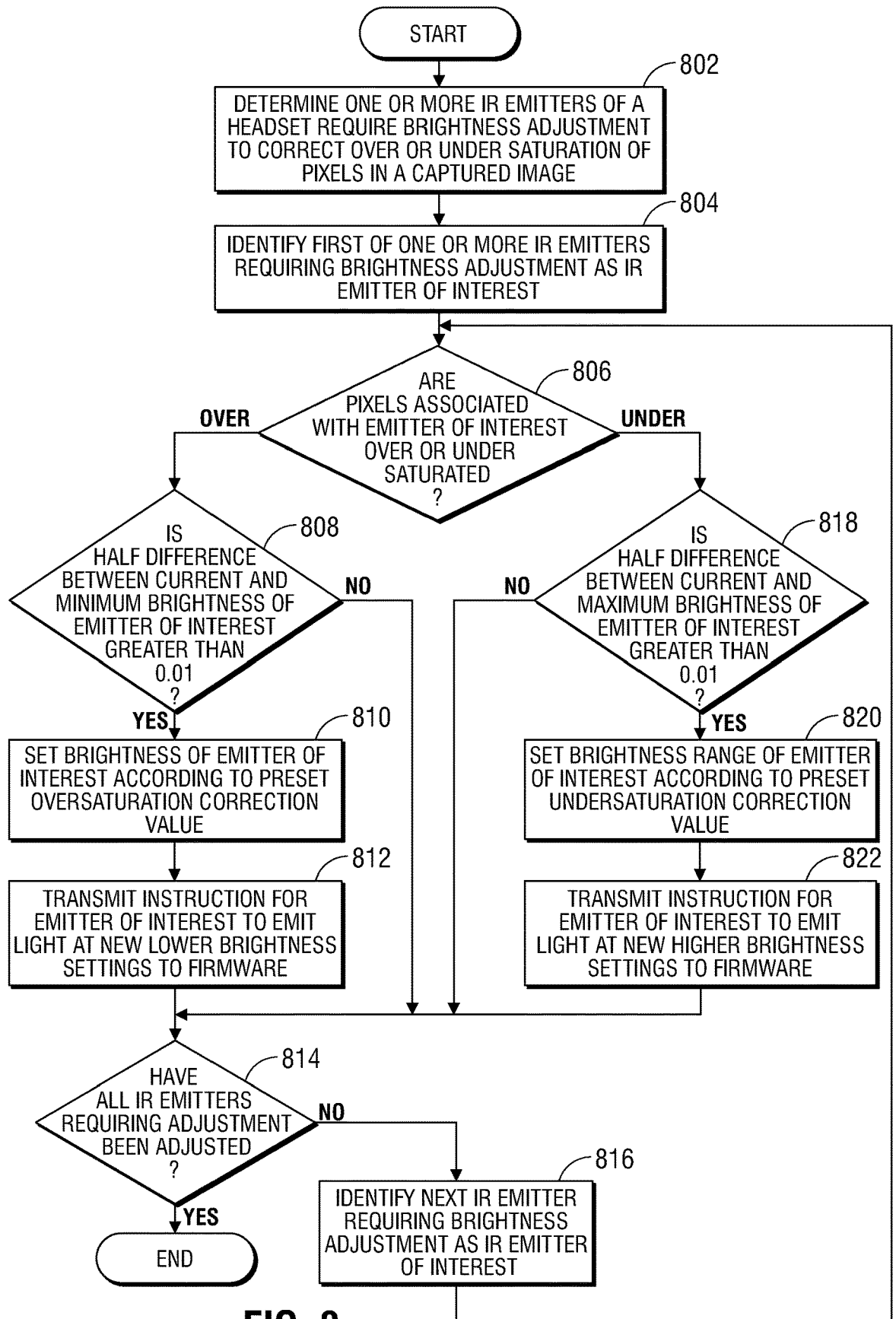
FIG. 8 is a flow diagram illustrating a method of adjusting the brightness of an IR emitter according to an embodiment of the present disclosure.

In some embodiments, the IR saturation control system may adjust brightness of individual IR emitters separately in order to optimize saturation based on changing lighting conditions at block 512. For example, in an embodiment in which desk lamp 210 moves from an on state to an off state and floor lamp 218 moves from an off state to an on state between the calibration and a later point in a user session, the IR emitter saturation control system may adjust individual IR emitters onboard headset 202 separately. At the point during the user session at which the lighting conditions caused by desk lamp 210 and floor lamp 218 change in such a way, the intensity of light emitted toward the side of landmark 208 closest to the desk lamp 210 from IR emitters onboard headset 202 may be increased in order to account for the unanticipated absence of light from desk lamp 210. Similarly, the intensity of light emitted toward the side of landmark 208 closest to the floor lamp 218 from IR emitters onboard headset 202 may be decreased in order to account for the unanticipated presence of light from desk lamp 210. FIG. 8 describes in greater detail a method for determining which IR emitters require adjustment, and the degree of such adjustment. Once such an adjustment is made, the method may proceed to block 514 to determine whether the user session is still ongoing.

At block 514, once an adjustment to the brightness of one or more IR emitters has been made, the IR emitter saturation control system in an embodiment may determine whether the user session is complete. A user session may be complete when the user powers down the head mounted display within the wearable headset, causing the IR emitters onboard to also power down. If the user session is complete, no further adjustments to the IR light emitted by the onboard emitters may be needed, and the method may end. If the user session is not complete, the method may proceed to block 516 for generation of further SLAM frames. The method may then proceed back to block 510 to determine whether further adjustments should be made in the incremental fashion, or whether the IR emitter may need to be reset to calibration values.

In an embodiment in which adjustments based on user session histogram analyses have been made for a number of consecutive SLAM frames meeting the non-convergence limit value, this may indicate the incremental adjustment method is not likely to converge toward a properly saturated image, and the method may proceed to block 518. At block 508, the IR emitter saturation control system in an embodiment may reset the brightness value of one or more IR emitters to the same value such IR emitters had during the calibration session. This method may be employed, for example, when iterative changes of the method described with reference to block 512 fail to converge toward a brightness value that no longer over or under saturates the images underlying incoming SLAM frames.

At block 520, the IR emitter saturation control system in an embodiment may reset the frame count to zero. Once the frame count is reset to zero in an embodiment, the IR emitter saturation control system may not perform another brightness adjustment until another number of SLAM frames meeting the brightness test threshold value described with reference to block 506 have been generated. In other words, resetting the frame count to zero at block 520 may effectively reset the clock for the regular intervals at which the IR emitter saturation correction system performs brightness adjustment tests.

The IR emitter saturation control system in an embodiment may determine whether the user session is complete at block 522. If the user session is not complete, the method may proceed to block 508 for generation of a new session SLAM frame. Generation of such a new user session SLAM frame may increment the frame count value to one. The loop between blocks 506 and 508 may then be repeated until a number of SLAM frames meeting the brightness test threshold value have been generated since the frame count was reset to zero at block 520. In such a way, the IR emitter saturation control system in an embodiment may repeatedly adjust the brightness of one or more IR emitters to account for changes in environmental lighting conditions at regular intervals. If the user session is complete, the method may end.

Figure 6:
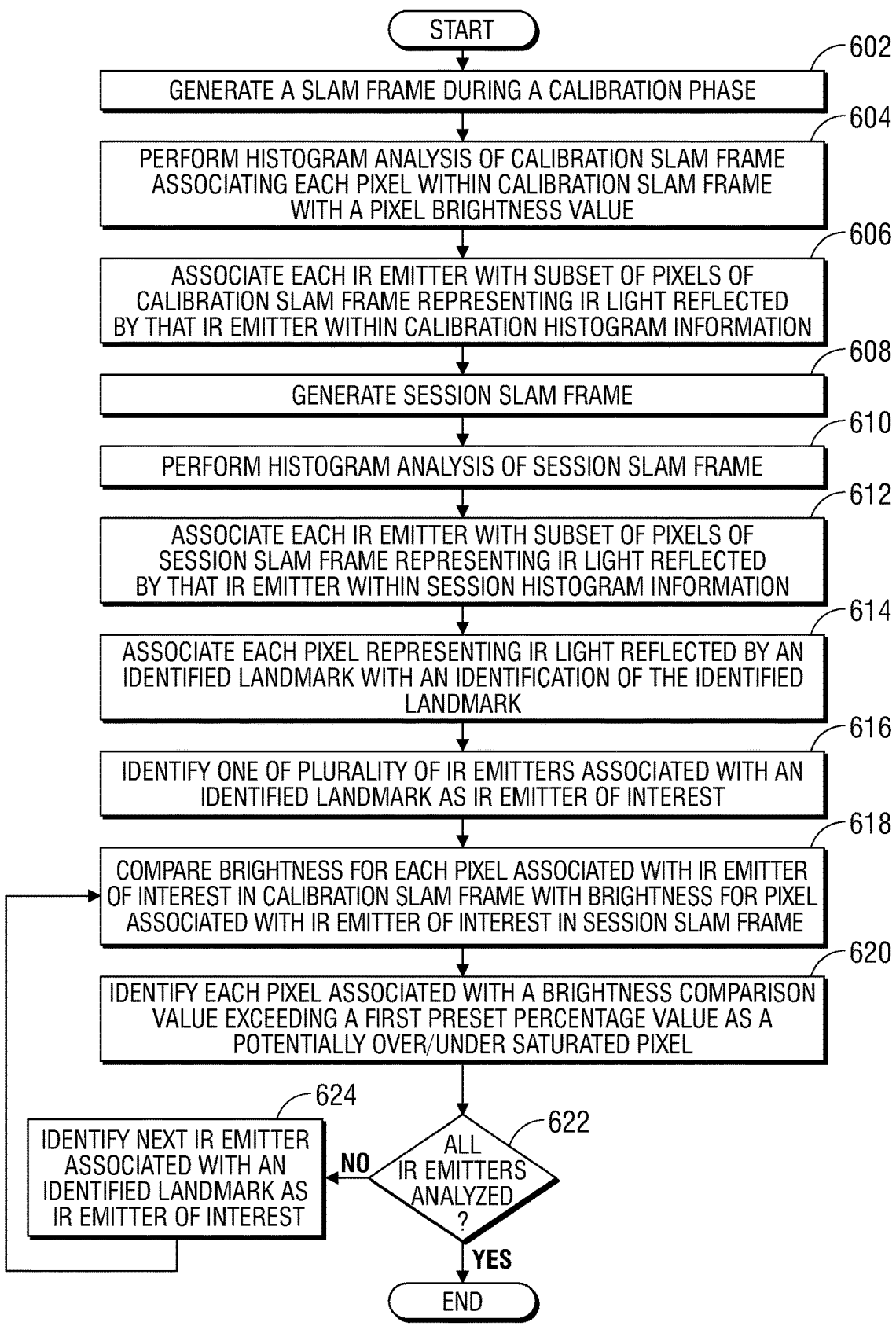
FIG. 6 is a flow diagram illustrating a method of identifying an IR emitter responsible for over or under saturation for a portion of a captured image according to an embodiment of the preset disclosure.

FIG. 6 is a flow diagram illustrating a method of identifying an IR emitter responsible for over or under saturation for a portion of a captured image used to measure distance between a headset and a landmark in its surrounding environment according to an embodiment of the preset disclosure. As described herein, the IR emitter saturation correction system in an embodiment may adaptively adjust individual IR emitters onboard a headset during a user session in order to respond to changes in lighting occurring after such IR emitters are calibrated. The method of FIG. 6 describes how the IR emitter saturation correction system isolates one or more IR emitter intensities that may need to be adjusted.

At block 602, the IR emitter saturation correction system in an embodiment may generate a SLAM frame during a calibration phase. The SLAM frame generated during the calibration phase may include a captured image of IR light emitted from a plurality of emitters housed onboard one or more headsets reflected off an object in the nearby environment. Several images may be captured over time during such a calibration session. An infrared emitter calibration system in an embodiment may adjust the intensity at which one or more IR emitters emit light during this calibration period until the captured images forming the SLAM frames have a desired saturation value. For example, in an embodiment described with reference to FIG. 2, wearable headset 202 may be calibrated at a time when wearable headsets 204-206 are not emitting IR light. In such an embodiment, the SLAM frame generated at block 602 may include an image captured by a camera onboard headset 202 of the IR light emitted by IR emitters onboard headset 202 as reflected off landmark 208. During such a calibration session, the brightness of one or more IR emitters onboard headset 202 may be adjusted to a calibration brightness value that produces images with the desired saturation value.

As another example, wearable headset 202 in an embodiment may be calibrated at a time when wearable headsets 204-206 are emitting IR light within the field of view of the camera onboard headset 202. In such an embodiment, the SLAM frame may include an image of the IR light emitted by IR emitters onboard headsets 202-206 as reflected off landmark 208. Because more infrared lights are reflected off the landmark 208 and toward the camera onboard headset 202 in this embodiment than in an embodiment in which headsets 204-206 are not emitting light, the saturation of the portion of the image including that reflected light may be significantly higher than in the image generated during a calibration session in which the headsets 204 and 206 are not emitting light. During such a calibration session, the brightness of one or more IR emitters onboard headset 202 may be adjusted to a calibration brightness value that is relatively lower than the brightness values for an embodiment in which headsets 204-206 are turned off in order to account for the presence of IR light emitted from headsets 204-206.

As yet another example, wearable headset 202 in an embodiment may be calibrated at a time when desk lamp 210 is turned on, and floor lamp 218 is turned off. In such an embodiment, the SLAM frame may include an image of light emitted from desk lamp 210 reflecting off landmark 208. The saturation of the portion of the image including light reflected from desk lamp 210 in such an embodiment may be higher than in an image in which the desk lamp 210 is turned off. In such an embodiment, a portion of the infrared emitters emitting light toward the side of the landmark 208 closest to the desk lamp 210 may be calibrated at block 602 to emit relatively lower intensity light in order to account for illumination from the desk lamp 210.

Calibration methods in embodiments of the present disclosure may be performed by an calibration system. For example, in an embodiment described with reference to FIG. 4, the infrared emitter calibration system 410 operating onboard the host information handling system 312 may perform such calibration sessions. Once calibration is complete in an embodiment, a calibration image having desired saturation values may be captured and incorporated within a calibration SLAM frame along with distance measurements made based on the calibration image.

The IR emitter saturation correction system in an embodiment may perform a histogram analysis of the calibration SLAM frame at block 604. The calibration histogram analysis performed at block 604 in an embodiment may associate each pixel within the calibration image underlying the calibration SLAM frame with a pixel brightness value. The saturation for each pixel in such an embodiment may fall within a range of desired saturation values. In other embodiments, the average saturation of all pixels in the image or within predetermined regions of the image may fall within a range of desired saturation values.

At block 606, the IR emitter saturation correction system in an embodiment may associate each IR emitter with a subset of pixels of the calibration SLAM frame representing IR light reflected by that IR emitter within the calibration histogram information. The IR emitter saturation correction system in an embodiment may identify pixels associated with a given IR emitter by determining which portion of a pattern of IR lights is being reflected in each pixel or group of pixels. As described herein, the depth of surfaces of nearby objects may be determined by analyzing the way in which a pattern of emitted IR light is distorted as it reaches surfaces of varying distances from the headset. For example, in an embodiment described with reference to FIG. 2, infrared emitters and sensors housed within or mounted on the exterior surfaces of the 202 may emit IR light 212 in a pattern toward the physical landmark 208 and a camera of headset 202 may then capture an image IR light 212 reflecting off the surfaces of the physical landmark 208. Headset 202 may then determine the depth of the physical landmark 208 by analyzing the way in which the pattern of emitted IR light 212 is distorted as it reaches the surfaces of physical landmark 208. As part of this analysis, which is known in the art, a group of pixels in a captured image may be identified as reflecting back a known portion of the pattern of lights. Further, a specific IR emitter housed on headset 202 may be associated (e.g. within memory or firmware) with that portion of the pattern being reflected back in the identified pixels. The IR emitter saturation correction system in an embodiment may thus reference both of these known factors in order to associate a group of pixels with an individual IR emitter housed in headset 202. The resulting calibration histogram information may thus associate each pixel in a calibration image with a calibration brightness or intensity and with one of the plurality of IR emitters housed on the headset 202. For example, a central pixel (e.g. located in the center of the calibration image) may be associated with a brightness value of 100 cd and with a first IR emitter. As another example, a pixel in the top right corner of the calibration image may be associated with a brightness value 200 cd and with a second IR emitter.

At the onset of a user session following calibration, the IR emitter saturation control system in an embodiment may generate session SLAM frames at block 608. Each session SLAM frame in an embodiment may include a captured image of the pattern of lights emitted by the plurality of IR emitters. As the session progresses, lighting changes may occur in the surrounding environment, causing the brightness at which each of the IR emitters calibrated at block 602 to over or under saturate the image.

The IR emitter saturation correction system in an embodiment may perform a session histogram analysis of the image underlying the session SLAM frame at block 610. The session histogram analysis may associate each pixel of the session image underlying the SLAM frame with a measured brightness or intensity value. Brightness or intensity values in such an embodiment may be measured in candelas.

At block 612, the IR emitter saturation correction system in an embodiment may associate each IR emitter with a subset of pixels of the session SLAM frame representing IR light reflected by that IR emitter within the session histogram information. Similarly to block 606, the IR emitter saturation control system in an embodiment may reference known relationships between portions of a pattern of light and particular IR emitters, and between groups of pixels and portions of the pattern reflected in those pixels within the session image in order to associate a group of pixels with an individual IR emitter housed in headset 202. Such identification of a group of pixels in the captured session image reflecting back a known portion of the pattern of lights may be performed as a measurement between the headset 202 and the landmark 208. For example, a central pixel of the session image (e.g. located in the center of the session image) may be associated with a brightness value of 50 cd and with the second IR emitter. As another example, a pixel in the top right corner of the session image may be associated with a brightness value 150 cd and with a third IR emitter.

The IR emitter saturation correction system in an embodiment may associate each pixel representing IR light reflected by an identified landmark with an identification of the identified landmark at block 614 in an embodiment. This may include identification of one or more landmarks within the captured image underlying the generated session SLAM frame. For example, in an embodiment described with reference to FIG. 2, an image captured by wearable headset 202 may include pixels representing IR light reflected by physical landmark 208 and desk lamp 210. In such an embodiment, the IR emitter saturation correction system may associate each pixel representing IR light reflected by identified landmark 208 with an identification of physical landmark 208, and associate each pixel representing IR light reflected by desk lamp 210 with an identification of desk lamp 210.

The IR emitter saturation correction system in an embodiment may identify one of a plurality of IR emitters associated with an identified landmark as an IR emitter of interest at block 616. For example, the headset 202 may include a plurality of IR emitters mounted on its exterior surface. The IR emitter saturation correction system in an embodiment may identify one of these mounted IR emitters as an emitter of interest if it is associated with an identified landmark in order to analyze whether the pixels associated with that IR emitter may be undergoing over saturation of under saturation, prompting a need to adjust the brightness of that IR emitter. By only analyzing IR emitters associated with identified landmarks, the IR emitter saturation correction system may focus on adjusting brightness of only IR emitters impacting the ability to identify landmarks and gauge distances between the headset housing the IR emitters and such landmarks.

At block 618, the IR emitter saturation correction system in an embodiment may compare brightness values for each pixel associated the IR emitter of interest in the calibration SLAM frame with brightness values for pixels associated with the IR emitter of interest in the session SLAM frame. For example, in an embodiment, the second emitter may be associated at block 606 with a pixel in the top right corner of the calibration image, having a brightness value of 100 cd, and may be associated at block 612 with a central pixel of the session image, having a brightness value 50 cd. In such an embodiment, the IR emitter saturation correction system may determine the degree to which the brightness value of the pixel associated with the IR emitter of interest within the session histogram differs from the brightness value of the pixel associated with the IR emitter of interest within the calibration histogram. For example, the IR emitter saturation correction system may divide the brightness value 50 cd of the central pixel of the session image by the brightness value 100 cd of the top right corner pixel of the calibration image to give a brightness comparison value difference of 50%.

The IR emitter saturation correction system in an embodiment may identify each pixel associated with a brightness comparison value exceeding a first preset percentage value as a potentially over/under saturated pixel at block 620. The preset percentage value in an embodiment may define the range of desirable saturation values, and may be given any value prior to the start of the user session. For example, the preset percentage value may be 20% in an embodiment, such that any values falling within range 20% higher or 20% lower than the calibration brightness may be considered desirable. In another embodiment, the preset percentage value may be 60%.

In an embodiment, the second IR emitter may be the IR emitter of interest, and the second IR emitter may be associated with the central pixel of the session image, for example. If the brightness comparison value difference of 50%, determined at block 618 for the central pixel of the session image exceeds a preset percentage value of 20%, that pixel may be identified as over or under saturated. In other words, if the brightness 50 cd of the central pixel of the session image is more than 20% higher or lower than the brightness 100 cd of the top right corner pixel of the calibration image, the central pixel of the session image may be identified as a potentially over saturated pixel. In another example, if the brightness comparison value difference of 50% falls below a preset percentage value of 60%, that pixel may not be identified as over or under saturated.

At block 622, the IR emitter saturation control system in an embodiment may determine whether all IR emitters have been analyzed. For example, if pixels associated with a first and second of a plurality of infrared emitters housed along the exterior of headset 202 have been analyzed for potential over or under saturation, the IR emitter saturation control system may determine whether the remaining infrared emitters have not yet been analyzed. If the pixels within the session image associated with all IR emitters have been analyzed for potential over or under saturation, the method may proceed to block 625. However, if pixels in the session image associated with IR emitters (e.g. a third IR emitter on headset 202) have not been analyzed, the method may proceed to block 624.

The IR emitter saturation control system in an embodiment may identify a next IR emitter as an IR emitter of interest at block 624 if the pixels associated with all IR emitters have not each been analyzed for potential over or under saturation. For example, in an embodiment in which the IR emitter saturation control system determines that pixels associated with a third IR emitter on headset 202 have not yet been analyzed for potential over or under saturation, the third IR emitter on headset 202 may be identified at block 624 as the next emitter of interest. The method may then loop back to block 618 for determination as to whether pixels associated with the third IR emitter are potentially under or over saturated. The loop between blocks 608 and 624 may repeat until all pixels in the session SLAM frame associated with an IR emitter at block 612 have been analyzed for potential under or over saturation. This analysis associates each pixel within the session image that is also associated with an IR emitter with an identification as potentially over saturated, potentially under saturated, or neither. Pixels within the session image not associated with an IR emitter and an identified landmark, to the extent any exist, may be associated with an identification as neither under nor over saturated in such an embodiment. In other aspects, pixels may be associated with plural IR emitters and assessed relative to multiple IR emitters according to embodiments herein. In such a way, the IR emitter saturation correction system may associate each pixel representing IR light reflected from an identified landmark with the identified landmark, the IR emitter emitting the reflected light, and a designation as under saturated, over saturated, or neither.

Figure 7:
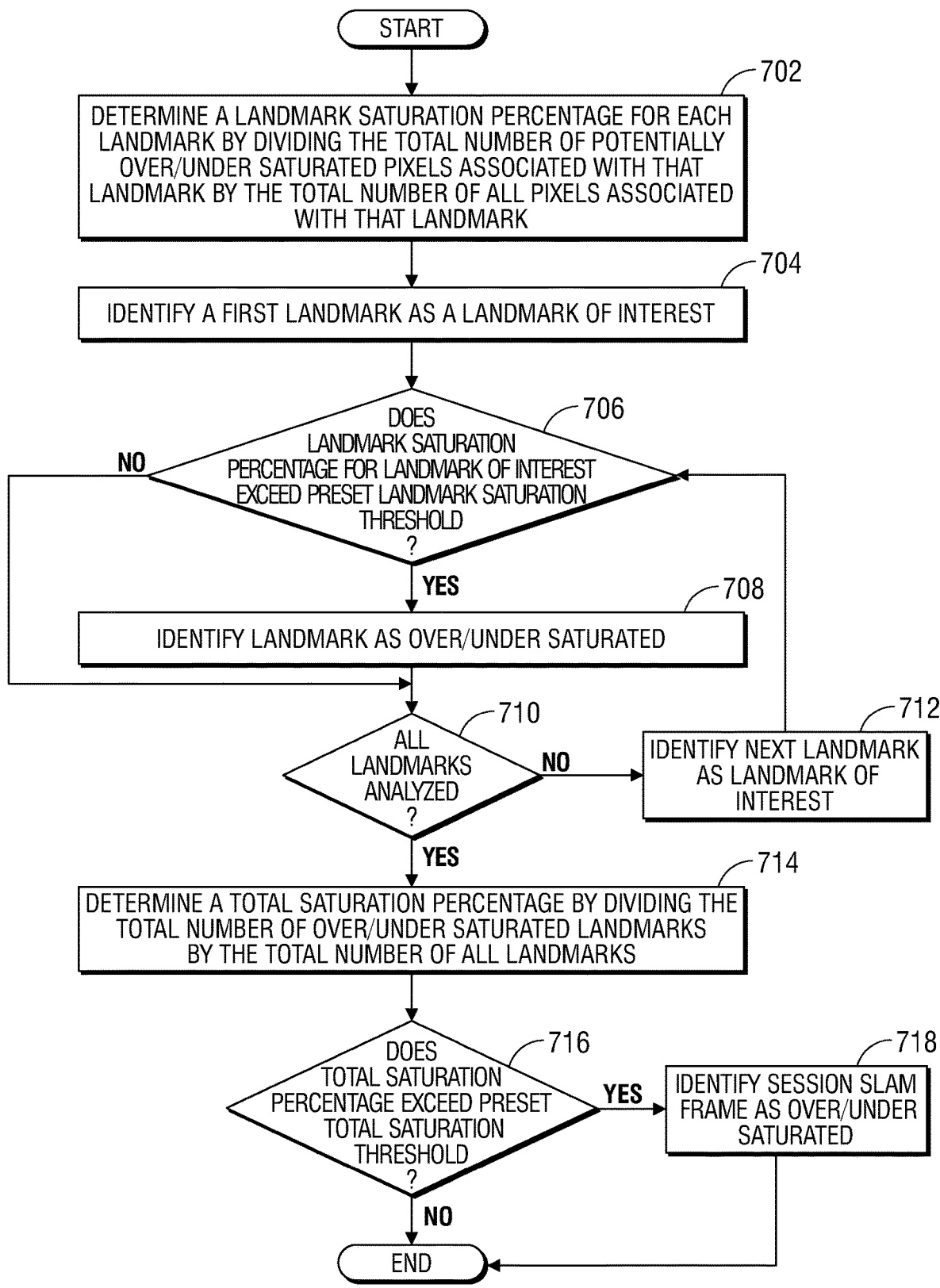
FIG. 7 is a flow diagram illustrating a method of determining a SLAM frame is over or under saturated sufficient to require correction according to an embodiment of the present disclosure.

FIG. 7 is a flow diagram illustrating a method of determining whether an image underlying a SLAM frame is under or over saturated such that adjustment of one or more IR emitters may be needed according to an embodiment of the present disclosure. As described herein, the IR emitter saturation control system in an embodiment may perform adjustments to IR emitters in order to increase the accuracy of distance measurements between a headset housing the IR emitter and an identified nearby landmark. In order to conserve resources, the IR emitter saturation control system in an embodiment may perform adjustments specifically to IR emitters causing over or under saturation of portions of a captured image used to identify such landmarks or to measure distance between such landmarks and the headset. The method of FIG. 7 represents a method for determining whether adjustment to one or more IR emitters may be necessary based on a determination of whether such IR emitters are causing over or under saturation of the specific portions of an image used to identify or gauge distance to landmarks.

At block 702, the IR emitter saturation control system in an embodiment may determine a landmark saturation percentage for each landmark by dividing the total number of potentially over or under saturated pixels associated with that landmark by the total number of all pixels associated with that landmark. In an embodiment described with reference to FIG. 6, the IR emitter saturation control system may associate each pixel representing IR light reflected from an identified landmark with that specifically identified landmark, the IR emitter emitting the reflected light, and a designation as under saturated, over saturated, or neither. Such an association may be stored in a memory accessible by the IR emitter saturation control system in an embodiment. Thus, the IR emitter saturation control system may access the memory to determine the total number of pixels associated with a given landmark, determine the number of pixels associated with that given landmark that are also identified as over or under saturated, and compare these two values. In such a way, the IR emitter saturation control system may determine a landmark saturation percentage for the given landmark. The landmark saturation percentage may describe the degree to which pixels needed to measure the distance toward the given landmark are under or over saturated, thus decreasing the accuracy of such measurements. The IR emitter saturation control system in an embodiment may perform this comparison to determine a landmark saturation percentage for all identified landmarks.

The IR emitter saturation control system in an embodiment may identify a first landmark as a landmark of interest at block 704. For example, in an embodiment described with reference to FIG. 2, the physical landmark 208 and the desktop lamp 210 may be identified as landmarks in an image captured by wearable headset 202. In such an embodiment, the IR emitter saturation control system may identify the physical landmark 208 as the landmark of interest at block 704.

At block 706, the IR emitter saturation control system in an embodiment may determine whether the landmark saturation percentage for the landmark of interest exceeds a preset landmark saturation threshold. The landmark saturation threshold in an embodiment may have any value between zero and one hundred percent, and may be set at any time prior to the start of the user session. The value of the landmark saturation threshold may be determined based on desired accuracy of distance measurements between landmarks and the headset. For example, the minimum accuracy of distance measurements sufficient to successfully track a given landmark from one frame to another may be determined prior to or during a calibration session. Such an ability to track landmarks between SLAM frames may be required to enable the headset to determine its location with respect to its surrounding environment without employing a processor-intensive brute force localization method. For example, it may be determined that distance measurements must meet a minimum accuracy tolerance of 5% in order to successfully track landmarks between SLAM frames.

It may also be determined, prior to or during a calibration session, the over saturation or under saturation percentage that may cause the distance measurements made based on the over or under saturated image to fall below the determined minimum accuracy. For example, it may be determined that over saturation or under saturation of 40% of pixels used to measure a distance between a given landmark and the headset may increase the error margin for the distance measurement from a value below 5% to a value over 5% (e.g. 20%). In another embodiment, it may be determined that over saturation or under saturation of 10% of pixels used to measure a distance between a given landmark and the headset may result in an error margin below 5%, such that it meets the determined minimum accuracy. The preset landmark saturation threshold in an embodiment may be the percentage of over saturation or under saturation in pixels associated with a given landmark that may cause the distance measurements made based on the over or under saturated image to fall below the determined minimum accuracy. The IR emitter saturation control system in an embodiment may compare this preset landmark saturation threshold (e.g. 40%, or 10%) to the landmark saturation percentage for the landmark of interest. If the landmark saturation percentage for the landmark of interest exceeds the preset landmark saturation threshold, the method may proceed to block 708. If the landmark saturation percentage for the landmark of interest does not exceed the preset landmark saturation threshold, this may indicate that a sufficient proportion of the pixels associated with the landmark of interest are appropriately saturated such that distance measurements made based upon those pixel brightness value will fall within accuracy tolerance, and the method may proceed to block 710.

At block 708, in an embodiment in which the landmark saturation percentage for the landmark of interest exceeds the preset landmark saturation threshold, the landmark of interest may be identified as over or under saturated. If the landmark saturation percentage for the landmark of interest exceeds the preset landmark saturation threshold describing the percentage of pixels associated with the landmark of interest that are identified as over or under saturated exceeds the preset landmark saturation threshold in an embodiment, this may indicate the pixels associated with the landmark are sufficiently over or under saturated so as to decrease accuracy of distance measurements made based on those pixel brightness values below the minimum accuracy. Thus, the IR emitter saturation control system may identify the landmark of interest as over or under saturated, and the method may proceed to block 710 for analysis of remaining landmarks.

At block 710, the IR emitter saturation control system in an embodiment may determine whether all landmarks in a given SLAM frame have been analyzed for over or under saturated pixels. The IR emitter saturation control system in an embodiment may adjust IR emitter brightness in an embodiment if a sufficient percentage of total landmarks in an image are identified as over or under saturated. For example, if only two landmarks are identifiable in an image, and one of the two landmarks has been identified as over or under saturated, the ability track either of the two identified landmarks between SLAM frames may be significantly comprised. However, as another example, if a dozen landmarks are identifiable in an image, and only one of the twelve has been identified as over or under saturated, the under or over saturation of pixels related to the one landmark may not significantly impact the ability to track the other eleven landmarks between SLAM frames. As such, the IR emitter saturation control system may determine whether each of the identifiable landmarks in a given image is over or under saturated. If all landmarks have been analyzed to determine if their associated pixels are over or under saturated, the method may proceed to block 714. If all landmarks have not been analyzed in such a way, the method may proceed to block 710.

The IR emitter saturation control system in an embodiment may identify the next identifiable landmark in the image as the landmark of interest at block 712. For example, in an embodiment described with reference to FIG. 2, if the IR emitter saturation control system identified the physical landmark 208 as the landmark of interest at block 704, the desk lamp 210 may be identified as the next landmark of interest at block 712. The method may then proceed back to block 706 for determination as to whether the desk lamp 210 should be identified as over or under saturated. The loop between blocks 706 and 712 may be repeated in an embodiment until it has been determined whether each of the identifiable landmarks in a given image are over or under saturated.

In an embodiment in which all landmarks have been identified as over saturated, under saturated, or neither, the IR emitter saturation control system may determine a total saturation percentage at block 714. The IR emitter saturation control system in an embodiment may determine a total saturation percentage by dividing the total number of over or under saturated landmarks by the total number of all landmarks. As described herein, the IR emitter saturation control system in an embodiment may adjust IR emitter brightness in an embodiment if a sufficient percentage of total landmarks in an image are identified as over or under saturated. In order to make such a determination, it must first be determined which percentage of identified landmarks are identified as over or under saturated.

At block 716, the IR emitter saturation control system in an embodiment may determine whether the total saturation percentage exceeds a preset total saturation threshold. In an embodiment, the total saturation threshold may describe a point at which the accuracy of distance measurements falls below a minimum tolerance, such that an ability to track one or more landmarks between SLAM frames is compromised. The total saturation threshold in an embodiment may have any value between zero and one hundred percent, and may be preset prior to or during a calibration session. For example, the total saturation threshold in an embodiment may be 25%, 50%, or 75%. In other embodiments, other values between zero and one hundred percent are also contemplated. If the total saturation percentage exceeds the preset total saturation threshold, this may indicate enough landmarks are identified as over or under saturated to disrupt the ability to track landmarks between SLAM frames, and the method may proceed to block 718. If the total saturation percentage does not exceed the preset total saturation threshold, this may indicate any under or over saturation that may be occurring likely will not impact the ability to track landmarks between SLAM frames, and no adjustment to the brightness of any IR emitters may be needed.

The IR emitter saturation control system in an embodiment in which the total saturation percentage exceeds the preset total saturation threshold may identify a session SLAM frame as over or under saturated at block 718. In such an embodiment, the IR emitter saturation correction system may need to adjust the brightness of one or more identified IR emitters. Changes in lighting conditions surrounding the headset 202 occurring between the calibration of block 602 and generation of the SLAM frame including the session image at block 608 in an embodiment may cause under saturation or over saturation of enough pixels associated with identified landmarks in the session image to cause the total saturation percentage to exceed the preset total saturation threshold. For example, in an embodiment in which headset 202 was calibrated while headsets 204-206 were not emitting IR light, and the session image was later captured while headsets 204 and/or 206 emitted IR light, the IR light 214 or 216 emitted from headset 204 or 206, respectively, may over saturate pixels in the session image. In such an embodiment, the IR emitter saturation correction system may identify the session SLAM frame as over or under saturated, prompting adjustment of intensity at which one or more IR emitters are emitting IR light onboard the wearable headset 202 in order to decrease the saturation of the captured image.

As another example, in an embodiment in which headset 202 was calibrated while headsets 204-206 were emitting IR light, and the session image was later captured while headsets 204 and/or 206 were not emitting IR light, the absence of IR light 214 or 216 emitted from headset 204 or 206, respectively, may under saturate pixels in the session image. In such an embodiment, the IR emitter saturation correction system may identify the session SLAM frame as over or under saturated, prompting adjustment of the intensity at which one or more IR emitters are emitting IR light onboard the wearable headset 202 in order to increase the saturation of the captured image.

As yet another example, wearable headset 202 in an embodiment may be calibrated at a time when desk lamp 210 is turned on, and floor lamp 218 is turned off. In such an embodiment, if the desk lamp 210 is later turned off, and/or floor lamp 218 is later turned on, some pixels in the session image may become under saturated, while others become over saturated. In such an embodiment, the IR emitter saturation correction system may identify the session SLAM frame as over or under saturated, prompting adjustment the intensity of IR emitters associated with the over saturated pixels to decrease the saturation of those pixels, and simultaneous adjustment of the intensity of IR emitters associated with the under saturated pixels to increase the saturation of those pixels. The method may then end.

FIG. 8 is a flow diagram illustrating a method of adjusting the brightness of an IR emitter for adaptive infrared image saturation optimization during a user session according to an embodiment of the present disclosure. Once the IR emitter saturation correction system in an embodiment determines brightness of one or more IR emitters housed along the exterior of a wearable headset requires brightness adjustment, such as, for example, consequent to the method illustrated in an embodiment described with reference to FIG. 5, the IR emitter saturation correction system may employ the method illustrated by FIG. 7 to determine a degree to which the brightness of a given IR emitter should be adjusted.

At block 802, the IR emitter saturation control system in an embodiment may determine that one or more IR emitters of a headset require brightness adjustment to correct over or under saturation of pixels in a captured image. For example, in an embodiment in which histogram analyses for a plurality of consecutively captured infrared images indicate a sufficient proportion of potentially over or under saturated pixels, as explained in greater detail with reference to FIG. 6, the IR emitter saturation control system may determine one or more IR emitters require adjustment.

The IR emitter saturation correction system in an embodiment may identify a first one or more of the IR emitters requiring adjustment as an IR emitter of interest at block 804. Over or under saturation of an IR image captured during a user session may be caused by only one emitter emitting light at an intensity greater or less than an optimal value, or by multiple emitters doing so. The IR emitter saturation correction system in an embodiment may refer to the histogram analyses performed for each of the consecutive captured images identified as over or under saturated (so as to prompt adjustment pursuant to the method of FIG. 5) in order to identify which pixels require adjustment. For example, the IR emitter saturation correction system may identify each IR emitter associated in one or more of the histogram analyses with pixels identified as potentially over or under saturated as an emitter requiring adjustment. At block 804, one of these identified IR emitters may be identified as an IR emitter of interest.

At block 806, the IR emitter saturation correction system in an embodiment may determine whether the pixels associated with the emitter of interest are either identified as potentially over saturated or potentially under saturated. The histograms of the several consecutive captured images identified as over or under saturated may identify the plurality of pixels within each image having a brightness exceeding a threshold value as potentially over saturated and the plurality of pixels within each image having a brightness below a given threshold as potentially under saturated, as described in greater detail in FIG. 6. Each of these histograms may also associate each of the potentially over or under saturated pixels with an identified IR emitter. At block 806, the IR emitter saturation correction system may determine whether the majority of the pixels associated with the IR emitter of interest are identified as potentially over saturated or as potentially under saturated. If the majority of the pixels associated with the emitter of interest are over saturated, the method may proceed to block 808. If the majority of the pixels associated with the emitter of interest are under saturated, the method may proceed to block 818.

In an embodiment in which the majority of pixels associated with the emitter of interest are over saturated, the IR emitter saturation correction system may determine at block 808 whether the current brightness of the IR emitter of interest is sufficiently greater than the minimum possible brightness of the IR emitter of interest to warrant adjustment of the IR emitter of interest. For example, the IR emitter saturation control system may determine whether half the difference between the current brightness and the minimum brightness is greater than a preset boundary threshold. The preset boundary threshold may be set prior to the start of the user session. Example values of the boundary threshold include 0.01, 0.05, and 0.005. If half the difference between the current brightness and the minimum brightness is very small, the difference may be below the preset boundary threshold, and this may indicate decreasing the brightness of the IR emitter further in order to compensate for over saturation across one or more of the several consecutively captured images identified as over or under saturated may not significantly impact the overall saturation of future images. This may indicate the designation of these one or more consecutive images as over or under saturated is due to over saturation or under saturation by an emitter other than the IR emitter of interest. If half the difference between the current brightness and the minimum brightness is greater than the preset boundary threshold (e.g. 0.01), the method may proceed to block 810 for adjustment of the brightness of the emitter of interest. If half the difference between the current brightness and the minimum brightness is equal to or lesser than the preset boundary threshold, indicating the emitter of interest is not the cause of the overall over or under saturation of the recently captured images, the method may proceed to block 814, to analyze the next IR emitter identified as needing adjustment.

At block 810, the IR emitter saturation correction system in an embodiment may set the brightness of the IR emitter of interest to a value determined by a preset oversaturation correction formula. For example, in an embodiment in which half the difference between the current and minimum brightness is greater than the boundary threshold, the IR emitter saturation correction system may set the IR emitter of interest to have a new brightness dictated by the formula:

$$B_{NEW}=B_{CURRENT}-[(B_{CURRENT}-B_{MIN})\times C] \quad (1)$$

where C is a convergence coefficient having a value between zero and one.

As described above with reference to FIG. 5, such an adjustment may be made iteratively between blocks 506-514, on a per emitter basis, until the most recently captured images are properly saturated. Equation (1), above, adjusts the brightness of an IR emitter known to be causing over saturation incrementally closer to the minimum allowable brightness of that IR emitter. Performing this incremental change iteratively until a stable, preferred saturation is achieved is an implementation of a binary divide-and-conquer algorithm.

The convergence coefficient may have a default value of 0.5 in an embodiment. As the convergence coefficient (C) approaches zero, the time required to converge toward an IR emitter brightness that does not cause over or under saturation of a captured image using the iterative methods described herein may increase. As the convergence coefficient approaches one, the iterative methods described herein may cause oscillations of the IR emitter brightness above and below a brightness that does not cause over or under saturation, but may decrease the time of convergence.

In some embodiments, the convergence coefficient may be dynamically adjusted based on factors such as the application currently running on the wearable headset information handling system, number of users present, past histogram analyses, and other environmental factors. For example, in an embodiment in which multiple and repeated changes in lighting conditions are expected (e.g. collaborative remote meeting in which users enter and leave frequently), the convergence coefficient may be set closer to one, such that corrections to saturation occur more quickly. In another example, in an embodiment in which users of multiple headsets are less likely to enter or leave a session already in progress (e.g. virtual gaming environment), the convergence coefficient may be set closer to zero, such that convergence occurs more slowly, but results in fewer oscillations during that process.

In an embodiment in which the brightness of the emitter of interest has been adjusted according to the preset oversaturation correction formula described above, the IR emitter saturation correction system may transmit to firmware and an IR emitter driver an instruction for the emitter of interest to emit light at the new, lower brightness setting at block 812. For example, in an embodiment described with reference to FIG. 3, the IR emitter saturation correction system 132 operating onboard the headset 202 may transmit such an instruction to the firmware operating the infrared emitters 316. The IR emitter of interest within the infrared emitters 316 in such an embodiment may then emit light at the new brightness, as instructed by the firmware. As another example, in an embodiment described with reference to FIG. 4, the IR emitter saturation corrections system 132 operating onboard the host computer 312 may transmit such an instruction to the infrared emitters firmware 402 and drivers. In such an embodiment, a network adapter of host computer 312 may transmit the firmware 402 instructions to the headset 202, and the emitter of interest onboard the headset 202 may then emit light at the new brightness as directed by the firmware instructions from the host computer 312. The IR emitter of interest may then execute code instructions of the firmware to emit light at the new, lower brightness value. For example, the firmware in an embodiment may employ a constant current reduction method to decrease the brightness of the IR emitter of interest from the current brightness to the new, lower brightness determined by equation (2) above.

In an embodiment in which either an adjustment has been made to the IR emitter of interest, or in which it was determined at block 808 that the current brightness of the IR emitter of interest is too close to the minimum or maximum possible brightness to warrant an adjustment, the IR emitter saturation control system may determine at block 814 whether all IR emitters requiring adjustment have been adjusted. As described above, if the current brightness of the IR emitter of interest is too close to the minimum allowable brightness, this may indicate the emitter of interest is not the cause of the overall over saturation of the recently captured images. Similarly, if the current brightness of the IR emitter of interest in an embodiment in which the pixels associated with the emitter of interest are under saturated is too close to the maximum brightness allowable, the emitter of interest may not be the cause of the overall under saturation of the recently captured images. The IR emitter saturation control system in such circumstances may determine whether all emitters have been analyzed for possible adjustment. If all IR emitters have not been analyzed for adjustment, the method may proceed to block 816 for further analysis of other IR emitters. If all IR emitters have been analyzed for adjustment, the method may then end.

In an embodiment in which the majority of pixels associated with the emitter of interest are under saturated, the IR emitter saturation correction system may determine at block 818 whether the current brightness of the IR emitter of interest is sufficiently greater than the maximum possible brightness of the IR emitter of interest to warrant adjustment of the IR emitter of interest. For example, the IR emitter saturation control system may determine whether half the difference between the current brightness and the maximum brightness is greater than a preset boundary threshold (e.g. 0.01, 0.05, or 0.005). If half the difference between the current brightness and the maximum brightness is very small, this may indicate the designation of the one or more consecutive images as under saturated is due to under saturation caused by an emitter other than the IR emitter of interest, and the method may proceed to block 814 for identification of another IR of interest for analysis. If half the difference between the current brightness and the maximum brightness is greater than the preset boundary threshold, indicating the emitter of interest is at least partially to blame for the overall under saturation of the recently captured images, the method may proceed to block 820 for adjustment of the IR emitter of interest.

At block 820, the IR emitter saturation correction system in an embodiment may set the brightness of the IR emitter of interest to a value determined by a preset under saturation correction formula. For example, in an embodiment in which half the difference between the current and maximum brightness is greater than the boundary threshold, the IR emitter saturation correction system may set the IR emitter of interest to have a new brightness dictated by the formula:

$$B_{NEW} = B_{CURRENT} + [(B_{MAX} - B_{CURRENT}) \times C] \quad (1)$$

where C is a convergence coefficient having a value between zero and one.

As described above with reference to FIG. 5, such an adjustment may be made iteratively between blocks 506-514, on a per emitter basis, until the most recently captured images are properly saturated. Equation (2), above, adjusts the brightness of an IR emitter known to be causing under saturation incrementally closer to the maximum allowable brightness of that IR emitter. Performing this incremental change iteratively until a stable, preferred saturation is achieved is an implementation of a binary divide-and-conquer algorithm.

As also described above with respect to block 808, as the convergence coefficient (C) approaches zero, the time to converge may increase, and as the convergence coefficient approaches one, oscillations in emitter brightness may occur. The convergence coefficient may be set to a default value of 0.5, or may be dynamically adjusted based on factors such as the application currently running on the wearable headset information handling system, number of users present, past histogram analyses, and other environmental factors.

In an embodiment in which the brightness of the emitter of interest has been adjusted according to the preset under saturation correction formula (2) described above, the IR emitter saturation correction system may transmit to firmware and a driver an instruction for the emitter of interest to emit light at the new, higher brightness setting at block 822. The IR emitter of interest operating pursuant to the firmware instructions generated onboard the headset 202 or onboard the host computer 312 and transmitted to headset 202 may then emit light according to the new, higher brightness setting. For example, the firmware in an embodiment may employ a constant current increasing method to increase the brightness of the IR emitter of interest from the current brightness to the new, higher brightness determined by equation (2) above. The method may then proceed back to block 814 for further analysis of other IR emitters. Once all IR emitters potentially requiring adjustment have been analyzed according to the method of FIG. 7, each IR emitters causing over or under saturation of captured images forming the basis of SLAM frames may emit light at a brightness that does not cause over or under saturation of any portion of the images. By repeating this methodology throughout a user session, as described with reference to FIG. 5, the IR emitter saturation correction system in an embodiment may adaptively and continuously adjust the brightness of IR emitters to account for over or under saturation caused by changing environmental lighting.

The blocks of the flow diagrams of FIGS. 5-7 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating a wearable headset infrared (IR) emitter saturation correction system comprising:
an infrared emitter mounted on a wearable headset emitting IR light at a first brightness;
a camera capturing a calibration image of the IR light reflected from a first landmark;
a memory storing calibration histogram analysis of the calibration image associating each of a plurality of landmarks identified in the calibration image with brightness values for a subset of pixels within the calibration image, and with one or more of a plurality of IR emitters including the infrared emitter;
the camera capturing a session image of the IR light reflected from the first landmark;
a SLAM engine generating a first session SLAM frame based on the first session image;
a processor executing binary divide and conquer code instructions of the IR emitter saturation correction system to:
associate each of the plurality of landmarks identified in the session image with brightness values for a subset of pixels within the session image, and with one or more of the plurality of IR emitters including the infrared emitter;
determine whether the first session SLAM frame is over or under saturated based on a comparison, for each of the plurality of landmarks, of brightness values for the associated subset of pixels within the calibration image to brightness values for the associated subset of pixels within the session image;
determine an adjusted brightness for the infrared emitter based on the first brightness and a brightness range within which the infrared emitter is capable of emitting light if the first session SLAM frame is over or under saturated; and
the infrared emitter emitting light according to the adjusted brightness.

2. The information handling system of claim 1, further comprising:
the infrared emitter emitting light at the first brightness if the SLAM engine generates a consecutive number of over or under saturated SLAM frames meeting a non-convergence threshold value.

3. The information handling system of claim 1, further comprising:
the processor executing the binary divide and conquer code instructions at a regular interval in which the SLAM engine generates a consecutive number of SLAM frames meeting a brightness test threshold value.

4. The information handling system of claim 1, wherein the first session SLAM frame is over saturated and the adjusted brightness is an adjustable convergence coefficient multiplied by a difference between the first brightness and a minimum of the range of brightness values at which the infrared emitter is capable of emitting light, subtracted from the first brightness.

5. The information handling system of claim 3, wherein the convergence coefficient is determined based on a number of headsets emitting IR light reflecting off one or more of the plurality of landmarks.

6. The information handling system of claim 3, wherein the convergence coefficient increases as the number of headsets emitting IR light reflecting off one or more of the plurality of landmarks increases.

7. The information handling system of claim 3, wherein the convergence coefficient decreases as a number of instances in which the infrared emitter is adjusted to emit light at the first brightness during a user session increases.

8. A method of adaptively adjusting brightness of an infrared (IR) emitter comprising:
emitting IR light at a first brightness via an infrared emitter mounted on a wearable headset;
capturing a calibration image of the IR light reflected from a first landmark via a camera;
storing, via a memory, calibration histogram analysis of the calibration image associating each of a plurality of landmarks identified in the calibration image with brightness values for a subset of pixels within the calibration image, and with one or more of a plurality of IR emitters including the infrared emitter;
capturing a session image of the IR light reflected from the first landmark via the camera;
generating a first session SLAM frame based on the first session image, via a SLAM engine;
associating each of the plurality of landmarks identified in the session image with brightness values for a subset of pixels within the session image, and with one or more of the plurality of IR emitters including the infrared emitter, via a processor;
determining, via the processor, whether the first session SLAM frame is over or under saturated based on a comparison, for each of the plurality of landmarks, of brightness values for the associated subset of pixels within the calibration image to brightness values for the associated subset of pixels within the session image;
determining an adjusted brightness for the infrared emitter, via the processor, based on the first brightness and a brightness range within which the infrared emitter is capable of emitting light if the first session SLAM frame is over or under saturated; and
emitting light via the infrared emitter according to the adjusted brightness.

9. The method of claim 8, further comprising:
emitting light via the infrared emitter at the first brightness if the SLAM engine generates a consecutive number of over or under saturated SLAM frames meeting a non-convergence threshold value.

10. The method of claim 8, wherein the adjusted brightness is an adjustable convergence coefficient multiplied by a difference between a maximum of the range of brightness values at which the infrared emitter is capable of emitting light and the first brightness, added to the first brightness.

11. The method of claim 10, wherein the convergence coefficient is determined based on a number of headsets emitting IR light reflecting off one or more of the plurality of landmarks.

12. The method of claim 10, wherein the convergence coefficient decreases as the number of headsets emitting IR light reflecting off one or more of the plurality of landmarks decreases.

13. The method of claim 10, wherein the convergence coefficient decreases as a number of instances in which the infrared emitter is adjusted to emit light at the first brightness during a user session increases.

14. The method of claim 10, wherein the first session SLAM frame is under saturated.

15. An information handling system operating a wearable headset infrared (IR) emitter saturation correction system comprising:

an infrared emitter mounted on a wearable headset emitting IR light at a first brightness;

a camera capturing a calibration image of the IR light reflected from a first landmark;

a memory storing calibration histogram analysis of the calibration image associating each of a plurality of landmarks identified in the calibration image with brightness values for a subset of pixels within the calibration image, and with one or more of a plurality of IR emitters including the infrared emitter;

the camera capturing a session image of the IR light reflected from the first landmark;

a SLAM engine generating a first session SLAM frame based on the first session image;

a processor executing binary divide and conquer code instructions of the IR emitter saturation correction system to:

associate each of the plurality of landmarks identified in the session image with brightness values for a subset of pixels within the session image, and with one or more of the plurality of IR emitters including the infrared emitter;

determine whether the first session SLAM frame is over or under saturated based on a comparison, for each of the plurality of landmarks, of brightness values for the associated subset of pixels within the calibration image to brightness values for the associated subset of pixels within the session image;

determine an adjusted brightness, if the first session SLAM frame is over or under saturated, equivalent to an adjustable convergence coefficient multiplied by a difference between the first brightness and a minimum or maximum of the range of brightness values at which the infrared emitter is capable of emitting light, subtracted from the first brightness; and the infrared emitter emitting light according to the adjusted brightness.

16. The information handling system of claim 15, further comprising:

the infrared emitter emitting light at the first brightness if the SLAM engine generates a consecutive number of over or under saturated SLAM frames meeting a non-convergence threshold value.

17. The information handling system of claim 15, further comprising:

the processor executing the binary divide and conquer code instructions at a regular interval in which the SLAM engine generates a consecutive number of SLAM frames meeting a brightness test threshold value.

18. The information handling system of claim 15, wherein the convergence coefficient increases as the number of headsets emitting IR light reflecting off one or more of the plurality of landmarks increases.

19. The information handling system of claim 15, wherein the convergence coefficient decreases as the number of headsets emitting IR light reflecting off one or more of the plurality of landmarks decreases.

20. The information handling system of claim 15, wherein the convergence coefficient decreases as a number of instances in which the infrared emitter is adjusted to emit light at the first brightness during a user session increases.

* * * * *